(12) United States Patent
Ganig et al.

(10) Patent No.: US 11,994,648 B2
(45) Date of Patent: May 28, 2024

(54) SYSTEMS AND DEVICES FOR MONITORING PRECIPITATION, AND METHODS RELATED THERETO

(71) Applicant: CLIMATE LLC, San Francisco, CA (US)

(72) Inventors: Nicholas Ganig, Buffalo Grove, IL (US); Adam Gaynor, Chicago, IL (US); Jongjin Kim, Vernon Hills, IL (US); Chris Mikelson, Urbandale, IA (US); David Nicozisin, Chicago, IL (US); Aaron Petersdorf, Hampshire, IL (US); Samuel Rodriguez, Arlington Heights, IL (US)

(73) Assignee: CLIMATE LLC, Saint Louis, MO (US)

( * ) Notice: Subject to any disclaimer, the term of this patent is extended or adjusted under 35 U.S.C. 154(b) by 0 days.

(21) Appl. No.: 17/857,969

(22) Filed: Jul. 5, 2022

(65) Prior Publication Data

US 2023/0010246 A1   Jan. 12, 2023

Related U.S. Application Data

(60) Provisional application No. 63/219,186, filed on Jul. 7, 2021.

(51) Int. Cl.
*G01W 1/14* (2006.01)
*G01W 1/10* (2006.01)

(52) U.S. Cl.
CPC ............... *G01W 1/14* (2013.01); *G01W 1/10* (2013.01)

(58) Field of Classification Search
CPC .................................. G01W 1/14; G01W 1/10
See application file for complete search history.

(56) References Cited

U.S. PATENT DOCUMENTS

| 3,989,066 A | 11/1976 | Sturman et al. |
| 4,018,362 A | 4/1977 | Ubaud |

(Continued)

FOREIGN PATENT DOCUMENTS

| CN | 201280424 | 7/2009 |
| JP | S63-132153 | 6/1988 |

(Continued)

OTHER PUBLICATIONS

U.S. Appl. No. 15/551,582, filed Apr. 27, 2016, Koch et al.
U.S. Appl. No. 17/010,471, filed Sep. 2, 2020, Koch et al.

*Primary Examiner* — Natalie Huls
*Assistant Examiner* — Sharad Timilsina
(74) *Attorney, Agent, or Firm* — Harness, Dickey & Pierce, P.L.C.

(57) ABSTRACT

Systems, methods, and devices are provided for monitoring precipitation. An example rain gauge device for use in such monitoring generally includes a first basin including at least one outlet for forming and releasing droplets of moisture, and at least two electrical contacts disposed proximate to the at least one outlet. A closed circuit is formed between the at least two electrical contacts when a droplet of moisture, released by the at least one outlet, contacts the at least two electrical contacts. The rain gauge device then also includes a processor communicatively coupled to the at least two electrical contacts. The processor is configured to determine presence of a moisture event based on the closed circuit formed by the droplet and the at least two electrical contacts and, in response to the determination, transmit an indication of the moisture event to a computing device.

19 Claims, 18 Drawing Sheets

(56) References Cited

U.S. PATENT DOCUMENTS

| | | | |
|---|---|---|---|
| 4,302,969 A | 12/1981 | Tavoni | |
| 4,520,667 A | 6/1985 | Nelson | |
| 4,827,766 A * | 5/1989 | Nelson | G01W 1/14 |
| | | | 73/170.21 |
| 5,920,827 A | 7/1999 | Baer et al. | |
| 5,943,630 A | 8/1999 | Busby et al. | |
| 6,141,614 A | 10/2000 | Janzen et al. | |
| 6,343,255 B1 | 1/2002 | Peek | |
| 8,573,049 B1 * | 11/2013 | Ware | G01W 1/14 |
| | | | 73/170.17 |
| 9,076,118 B1 | 7/2015 | Mewes | |
| 9,784,887 B1 | 10/2017 | Ulmer | |
| 10,768,340 B2 | 9/2020 | Koch et al. | |
| 2008/0184788 A1 | 8/2008 | Jeong | |
| 2009/0271044 A1 | 10/2009 | Venkataramu | |
| 2010/0300198 A1 * | 12/2010 | Matsuda | G01W 1/14 |
| | | | 73/170.21 |
| 2011/0046899 A1 | 2/2011 | Paz | |
| 2012/0109614 A1 | 5/2012 | Lindores | |
| 2016/0208540 A1 | 7/2016 | Matsui | |
| 2017/0351005 A1 * | 12/2017 | Alvarez | G01W 1/10 |
| 2021/0003743 A1 | 1/2021 | Koch et al. | |
| 2021/0026040 A1 * | 1/2021 | Aughton | G01W 1/14 |

FOREIGN PATENT DOCUMENTS

| | | |
|---|---|---|
| JP | 2004-144609 | 5/2004 |
| JP | 2005-214888 | 8/2005 |
| SU | 881646 | 11/1981 |
| UA | 20891 | 2/2007 |
| UA | 98817 | 12/2015 |

* cited by examiner

Data Manager

[ Nitrogen | Planting | Practices | Soil ]

Fall applied (4 Fields)
Crop Corn Product
Plant Date: 20XX-04-12
ILU 112 | Pop: 34000
[ Edit ] [ Apply ]

Planting 2(0 Fields)
Crop Corn Product
Plant Date: 20XX-04-15
ILU 83 | Pop: 34000
[ Edit ] [ Apply ]

Planting 3(0 Fields)
Crop Corn Product
Plant Date: 20XX-04-14
ILU 83 | Pop: 34000
[ Edit ] [ Apply ]

Planting 4(1 Fields)
Crop Corn Product
Plant Date: 20XX-04-13
ILU 112 | Pop: 34000
[ Edit ] [ Apply ]

[ + ]
Add New Planting Plan

| | | CROP | PLANTED ACRES | PRODUCT | RELATIVE MATURITY | TARGET YIELD | POPULATION (AVG) | PLA |
|---|---|---|---|---|---|---|---|---|
| ☐ | Select All | | | | | | | |
| ☐ | Ames, IA 1 Corn \| 100 \| Boone, IA | Corn | — | DMC82-M | 112 | 160 | 34000 | Apr |
| ☐ | Austin, MN 1 Corn \| 100 \| Fredricks, MN | Corn | — | DMC82-M | 114 | 160 | 36000 | Apr |
| ☐ | Boone, IN 1 Corn \| 100 \| Boone, IA | Corn | — | DMC82-M | 112 | 150 | 34000 | Apr |
| ☐ | Champaign 1 Corn \| 100 \| Champaign, IL | Corn | — | — | 112 | 200 | 34000 | Apr |
| ☐ | E Nebraska 1 Corn \| 100 \| Burt, NE | Corn | — | — | 112 | 160 | 34000 | Apr |

FIG. 24

SYSTEMS AND DEVICES FOR MONITORING PRECIPITATION, AND METHODS RELATED THERETO

CROSS-REFERENCE TO RELATED APPLICATIONS

This application claims the benefit of, and priority to, U.S. Provisional Application No. 63/219,186, filed Jul. 7, 2021, the entire contents of all of which are hereby incorporated by reference as if fully set forth herein. The applicant hereby rescinds any disclaimer of claim scope in the parent applications or the prosecution history thereof and advises the USPTO that the claims in this application may be broader than any claim in the parent applications.

FIELD

The present disclosure generally relates to systems and devices for monitoring precipitation and methods relating thereto, and in particular, to moisture gauges and associated systems (and methods) for monitoring precipitation at/or across a desired location or region using, for example, conductive technology of the moisture gauges.

BACKGROUND

This section provides background information related to the present disclosure which is not necessarily prior art.

It is known for precipitation to be monitored. For example, rain may be collected in a container during a rain event and a user may manually examine the container to determine an amount of rain for the rain event based on the amount of rain that is collected in the container. After the rain event and/or after the container is full, the user is required to drain or empty the container, whereby subsequent rain events may be monitored. Alternatively, the container may include an integrated siphon mechanism to automatically drain or empty the container as desired (e.g., as in tipping bucket rain gauges, etc.).

SUMMARY

This section provides a general summary of the disclosure, and is not a comprehensive disclosure of its full scope or all of its features.

Example embodiments of the present disclosure are directed to systems and devices (e.g., moisture gauges, rain gauges, etc.) for use in monitoring moisture (e.g., as part of moisture events such as rain events, snow events, irrigation events, etc.; etc.).

In one example embodiment, a device for use in monitoring moisture generally includes a first basin including at least one outlet for forming and releasing droplets of moisture; at least two electrical contacts disposed proximate to the at least one outlet, wherein a closed circuit is formed between the at least two electrical contacts when a droplet formed by the at least one outlet contacts the at least two electrical contacts; and a processor communicatively coupled to the at least two electrical contacts, the processor configured to determine presence of a moisture event based on the closed circuit formed by the droplet and the at least two electrical contacts and, in response to the determination, transmit an indication of the moisture event to a computing device.

In another example embodiment, a device for use in monitoring moisture generally includes an upper compartment for collecting moisture, the upper compartment including at least one opening; a lower compartment disposed in vertical alignment with the upper compartment, the lower compartment configured to receive the collected moisture from the upper compartment through the at least one opening defined in the upper compartment; an outlet defined in the lower compartment, the outlet configured to form droplets from the collected moisture; a sensor disposed in alignment with the outlet, the sensor configured to identify the droplets formed by the outlet; and a processor communicatively coupled to the sensor, the processor configured to determine presence of a moisture event based on one or more signals from the sensor identifying the droplets formed by the outlet and, in response to the determination, transmit an indication of the moisture event to a computing device.

In still a further example embodiment, a system for use in monitoring moisture (e.g., precipitation, etc.) associated with a moisture event generally includes a computing device and multiple devices for use in monitoring moisture (e.g., moisture gauges, rain gauges, etc.), as just described, disposed in a field and in network communication with the computing device.

Example embodiments of the present disclosure are also directed to methods for use in monitoring moisture associated with moisture events (e.g., as part of rain events, snow events, irrigation events, etc.).

In one example embodiment, a method for monitoring moisture associated with a moisture event generally includes receiving moisture associated with a moisture event in a basin of a moisture gauge; forming, at an outlet of the basin, droplets from the received moisture; directing the formed droplets from the outlet to a sensor disposed in alignment with the outlet; identifying, by the sensor, the droplets and transmitting at least one signal to at least one processor of the moisture gauge for each of the identified droplets; determining, by the at least one processor, presence of a moisture event based on the one or more signals from the sensor; and in response to the determination, transmitting, by the at least one processor, an indication of the moisture event to a computing device.

Example embodiments of the present disclosure are further directed to non-transitory computer-readable storage media including executable instructions for use in monitoring moisture associated with moisture events (e.g., as part of rain events, snow events, irrigation events, etc.). In one example embodiment, a non-transitory computer-readable storage medium includes executable instructions, which, when executed by a processor of a moisture gauge, cause the at least one processor to: receive a signal from a sensor of a moisture gauge indicative of a droplet of moisture at the sensor; determine, based on the received signal, presence of a moisture event at the moisture gauge; and in response to determining presence of the moisture event, transmit an indication of the moisture event to a computing device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 24 depicts an example embodiment of a spreadsheet view for data entry.

Corresponding reference numerals indicate corresponding parts throughout the several views of the drawings.

DETAILED DESCRIPTION

Figure 1:
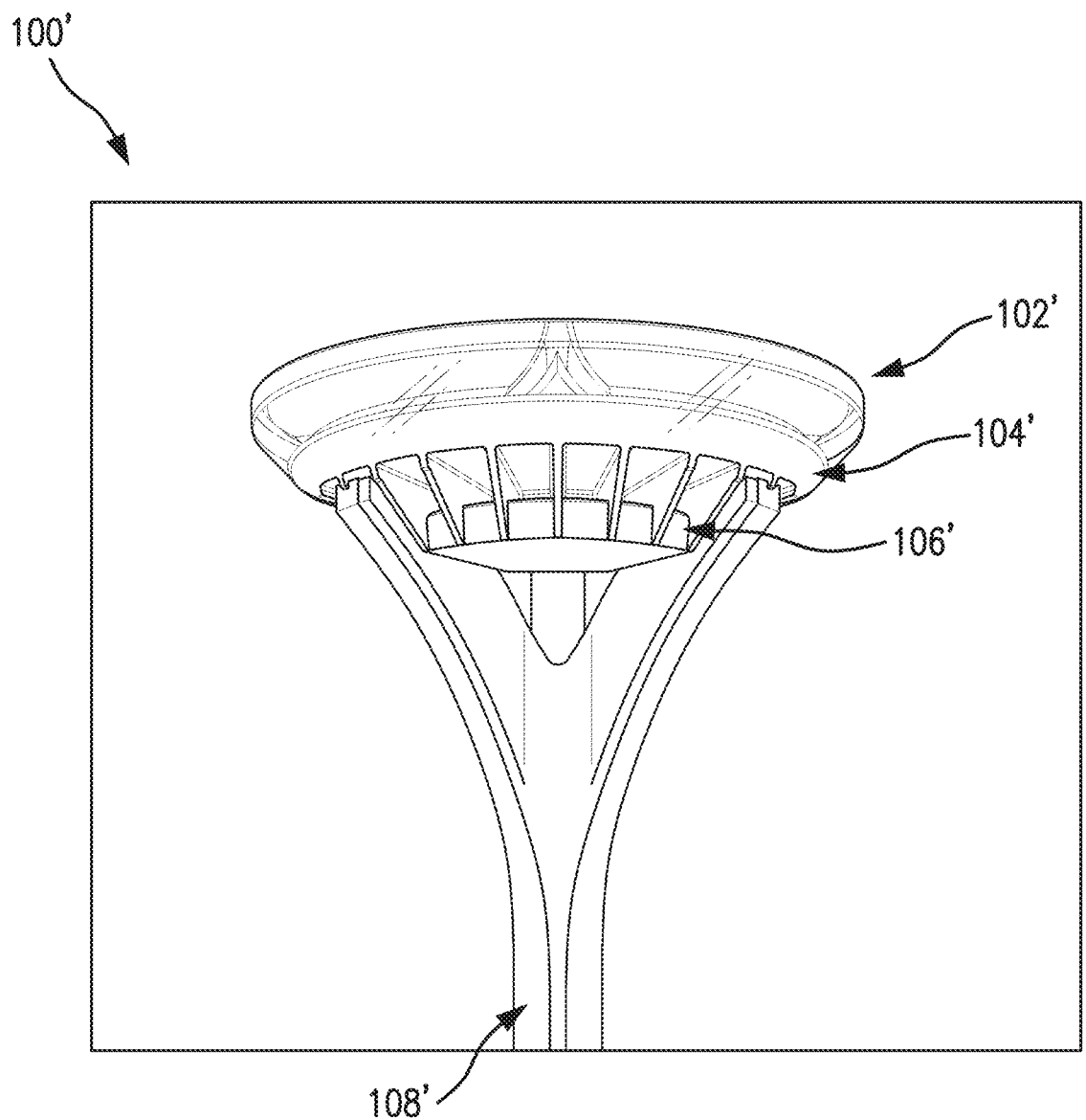
FIG. 1 is a perspective view of an example embodiment of a rain gauge (broadly, a moisture gauge or moisture measuring device) including one or more aspects of the present disclosure.

Example embodiments will now be described more fully with reference to the accompanying drawings. The description and specific examples included herein are intended for purposes of illustration only and are not intended to limit the scope of the present disclosure.

Rain events (broadly, precipitation or precipitation events or moisture events) are monitored by users for various purposes, including agronomic purposes. In connection therewith, users may use rain gauges to collect rain during such rain events, whereby the collected rain may be measured to determine amounts of rain for the rain events, rates of rain for the rain events, etc. In particular, during or after the rain events, the users may manually inspect the rain gauges to determine how much rain was collected in the rain gauges during (or after) the rain events (e.g., based on measurement marks included on the rain gauges, etc.), thereby estimating, determining, etc. how much rain was produced by (or associated with) the rain events, rates of rain produced by (or associated with) the rain events, etc. In some instances, the amounts of rain produced, collected, etc. during the rain events may exceed capacity of the rain gauges, resulting in inaccurate measurements. Further, in some instances, after the rain events and/or after the capacity of the rain gauges has been reached, users must manually drain or empty the rain gauges prior to subsequent rain events.

Uniquely, the systems, devices, and methods herein utilize example rain gauges (broadly, moisture gauges or moisture measuring devices, etc.) to provide for (or enable or facilitate) monitoring of moisture (e.g., precipitation during rain events, moisture from irrigation events, etc.) via conductive technology, whereby an amount of moisture (e.g., rain, etc.) may be determined from a flow of moisture that passes through the rain gauges. For example, instead of accumulating moisture within the rain gauges (e.g., to manually measure an amount based on the accumulated moisture as is conventional, etc.), the rain gauges each include a series of basins, outlets, and sensors which determine an indication of moisture (e.g., presence of rain, an amount of rain, etc.) while permitting all of the moisture to flow through the rain gauge, such that the rain gauge does not need to be periodically drained or emptied by a user. In particular, the rain gauges herein form droplets of moisture within the rain gauges using nozzles, and the droplets are released towards sensors. When a droplet contacts the sensor(s), a closed circuit is formed and the droplet is counted. An indication of moisture for the corresponding event may be determined from the counted droplets and transmitted to a user or multiple users (e.g., at their communication device(s), etc.). In this manner, the user(s) is/are permitted to monitor, during or after a moisture event, moisture data collected by the rain gauge(s), whereby the need to manually inspect the rain gauge(s) for measurement purposes is eliminated.

Example embodiments will now be described more fully with reference to the accompanying drawings. The description and specific examples included herein are intended for purposes of illustration only and are not intended to limit the scope of the present disclosure.

FIG. 1 illustrates an example embodiment of a rain gauge 100' (broadly, a moisture gauge or moisture measuring device) including one or more aspect(s) of the present disclosure. The rain gauge 100' is configured to collect rain during a rain event (or water during an irrigation event, or snow during a snow event, etc.) and measure rain data (e.g., start time/date of the rain event, end time/date of the rain event, rain rate for the rain event, rain rate for a desired time period (e.g., per year, per month, etc.), total rain in the rain event, total rain for a desired time period (e.g., per year, per month, etc.), etc.) from the collected rain, as the rain is captured by and passes through the rain gauge 100'. In particular, the rain gauge 100' is configured to control a flow of the collected rain (broadly, moisture) through the rain gauge 100' and to determine an indication (or presence) of rain based on detection of the flow of rain (e.g., detection of droplets, etc.) in or through the rain gauge 100' using conductive technology. In turn, following detection of rain (or at other times, etc.), the rain gauge 100' is configured to transmit the rain data to one or more users (e.g., to one or more computing devices associated with the user(s) using cellular technology, etc.). In this manner, the rain gauge 100' eliminates the need for users to physically inspect the rain gauge 100' for measurements and/or rain related data, and/or the need for users to periodically drain collected rain from the rain gauge 100'.

As shown, the example rain gauge 100' generally includes a rain collector 102' (broadly, an upper basin or second basin), a drop former 104' (broadly, a lower basin or first basin), a housing 106', and a support 108'. The support 108' is configured to couple to a bottom portion of the housing 106' and thereby support the rain collector 102', the drop former 104', and the housing 106' as needed, for example, above the ground in a field (e.g., on post 156 in FIG. 2, etc.), etc. for use as described herein. These parts of the rain gauge 100' will be described in more detail herein with reference to the rain gauge 100.

FIGS. 2-9 illustrate another example embodiment of a rain gauge 100 (broadly, a moisture gauge or moisture measuring device) including one or more aspect(s) of the present disclosure. The rain gauge 100 is substantially similar to the rain gauge 100' (whereby a description of the rain gauge 100 similarly applies to the rain gauge 100' and vice versa). For instance, the rain gauge 100 is configured to collect rain during a rain event (or water during an irrigation event, or snow during a snow event, etc.) and measure rain data (e.g., rain rate for the rain event or portion thereof, rain rate for a desired time period (e.g., per year, per month, etc.), total rain in the rain event, total rain for a desired time period (e.g., per year, per month, etc.), etc.) from the collected rain, as the rain is captured by and passes through the rain gauge 100. In particular, the rain gauge 100 is configured to control a flow of rain through the rain gauge 100 and to determine an indication (or presence) of rain based on detection of the flow of rain (e.g., detection of droplets, etc.) in or through the rain gauge 100 using conductive technology. In turn, following detection of rain (or at other times, etc.), the rain gauge 100 is configured to transmit the rain data to one or more users (e.g., to one or more computing devices associated with the user(s) using cellular technology, etc.). In this manner, the rain gauge 100 eliminates the need for users to physically inspect the rain gauge 100 for measurements and/or rain related data, and/or the need for users to periodically drain collected rain from the rain gauge 100.

Figure 2:
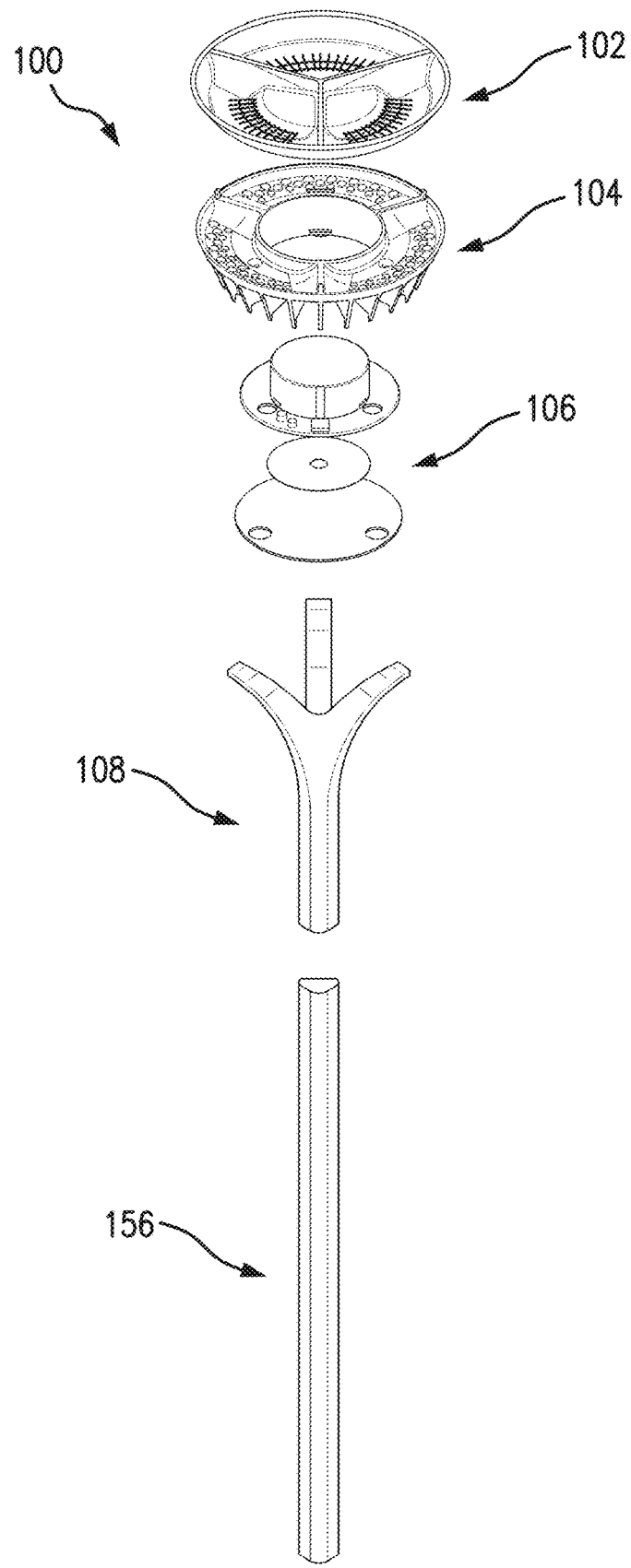
FIG. 2 is an exploded perspective view of another example embodiment of a rain gauge including one or more aspects of the present disclosure.
Figure 3:
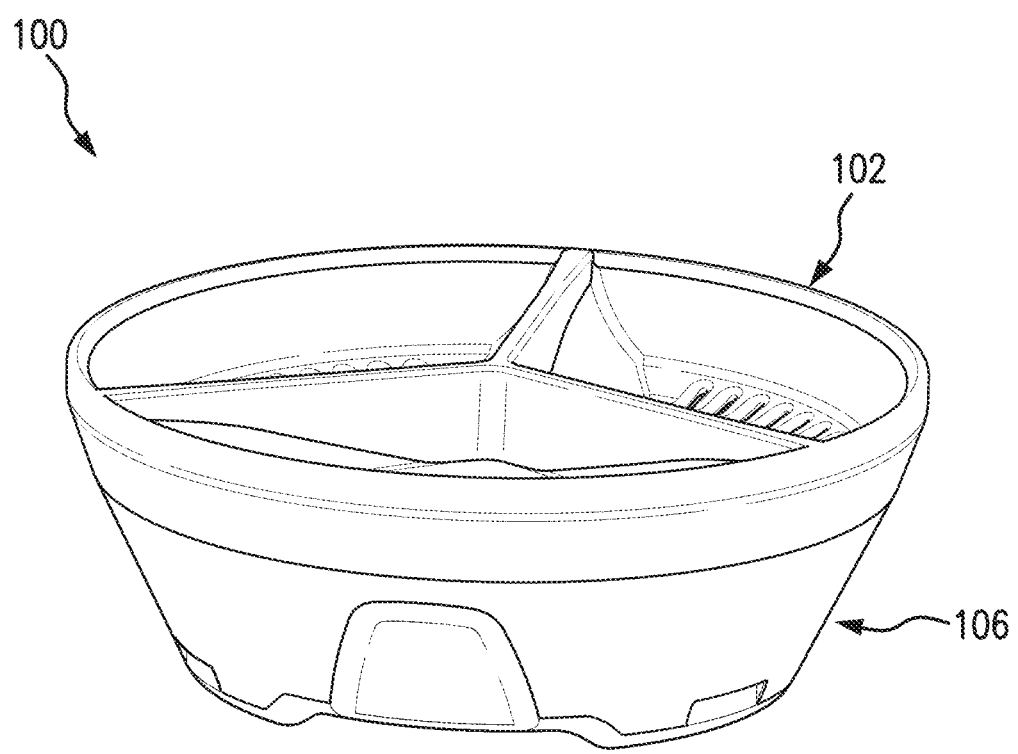
FIG. 3 is a perspective view of the rain gauge of FIG. 2, with an upper basis (or rain collector), a lower basis (or drop former), and a housing of the rain gauge illustrated in an assembled configuration.

As shown in FIGS. 2 and 3, the example rain gauge 100 generally includes a rain collector 102 (broadly, an upper basin or second basin), a drop former 104 (broadly, a lower basin or first basin), a housing 106, and a support 108. The support 108 is configured to couple to a bottom portion of the housing 106 and thereby support the rain collector 102, the drop former 104, and the housing 106 as needed, for example, above the ground in a field (e.g., on post 156, etc.), etc. for use as described herein (e.g., in the manner generally shown in FIG. 1, etc.).

With continued reference to FIGS. 2 and 3, the rain collector 102, or upper basin, is generally disposed toward a top of the rain gauge 100 and is configured to collect rain during a rain event (e.g., capture falling rain and direct the captured rain into the rain gauge 100, etc.). Then, as the rain is collected, the collected rain flows through the rain collector 102 and into the drop former 104, which is disposed generally below the rain collector 102. As will be described, the drop former 104, or lower basin, is structured to convert the collected rain into droplets that are of a generally consistent size, volume, etc. (e.g., for a given temperature, rain rate, etc.). The rain gauge 100 also includes various electronics (e.g., computing devices, sensors, etc.) within the housing 106 (as will be described in more detail hereinafter) configured to count a number of the droplets formed by the drop former 104. In general, as the droplets are released from the drop former 104, the droplets are detected and counted by the electronics in the housing 106 (e.g., by the sensors, etc.). And, rather than retaining the collected rain within the rain gauge 100 (e.g., such that the rain gauge 100 would need to be subsequently drained after a rain event, etc.), the rain gauge 100 permits all of the rain (e.g., all of the droplets, all of the counted droplets, etc.) to flow through the rain gauge 100 and out of a lower portion or bottom of the rain gauge 100 (and to the ground), whereby from such flow an indication of rain (e.g., a count of droplets, an amount of rain based on such count, a rate of rain based on such count, etc.) is determined, calculated, and/or extrapolated based on the droplets that are formed and detected (or counted) by the rain gauge 100. The rain collector 102 may be constructed from any suitable material within the scope of the present disclosure (e.g., plastic, metal, combinations thereof, etc.). In addition, in some embodiments the rain collector 102 may be transparent in appearance, for example, to inhibit birds from landing thereon, etc.

Figure 4:
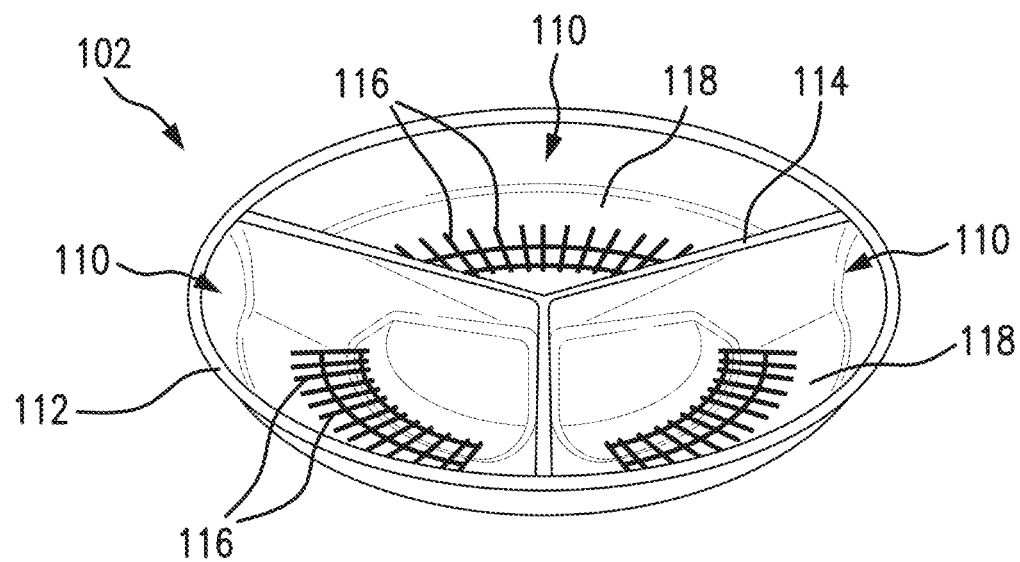
FIG. 4 is a perspective view of the upper basin of the rain gauge of FIG. 2.

With additional reference to FIG. 4, the illustrated rain collector 102 is divided into multiple compartments (each identified as 110) for collecting rain (however, the rain collector 102 may include a single compartment in some embodiments). The compartments 110 are defined, in part, by an outer wall 112 extending from an outer circumference of the rain collector 102 and by an inner divider 114. And, a capacity of each compartment 110 is generally defined by a height of the outer wall 112 and a height of the inner divider 114. In connection therewith, the outer wall 112 is angled generally outwards such that the capacity of the compartments 110 may be greater, and/or to encourage the collected rain water to flow generally into the compartments 110 (and towards openings 116 defined therein). In the illustrated embodiment, each compartment 110 is generally similar in configuration (e.g., same size, same shape, etc.). In other embodiments, however, one or more of the compartments 110 may be non-uniform in size and/or shape, for example, from other ones of the compartments 110 (e.g., the compartments may not be identical to each other, etc.).

The inner divider 114 of the rain collector 102 (FIG. 4) protrudes generally upwards from a surface 118 of the rain collector 102 and extends (or radiates) generally outwards from a central point of the rain collector 102 (e.g., in a Y-shaped configuration, etc.). In one embodiment, the illustrated rain collector 102 includes three compartments 110 configured to collect rain (as generally defined by the inner divider 114). In other embodiments, the inner divider 114 may include other configurations for dividing the rain collector 102 into the compartments 110. It should therefore be appreciated that a greater or lesser number of compartments 110 may be included within the rain collector 102 in such other embodiments. For example, in some embodiments, the rain collector 102 may include two compartments, four compartments, six compartments, ten compartments, more than ten compartments, etc. (e.g., generally formed by the inner divider 114 having one or more other configurations, etc.). Further, in some embodiments, the rain collector 102 may include only one compartment 110 (e.g., does not include the inner divider 114, etc.) for accumulating rain within the rain collector 102.

Each compartment 110 of the rain collector 102 includes a plurality of openings 116 (FIG. 4), which permit the rain accumulated in the rain collector 102 to pass through the rain collector 102 of the rain gauge 100 and into the drop former 104. In the illustrated embodiment, the openings 116 include multiple slots defined in the lower surface 118 of the rain collector 102, and positioned generally towards the outer circumference of the rain collector 102 (e.g., at the lowest part of the rain collector, etc.). In connection therewith, the surface 118 of each of the compartments 110 is generally sloped towards the openings 116 such that the collected rain will flow towards (and through) the openings 116 (e.g., from the center of the rain collector 102 towards the openings 116, from the outer circumference of the rain collector 102 towards the openings 116, etc.). In some embodiments, though, the openings 116 may be located differently within the scope of the present disclosure, and/or a greater or less number of openings 116, in the same or different configuration, may be defined by the rain collector 102 (e.g., as one or more slots, a grate, etc.) to permit rain to pass through the rain collector 102. Further, in some embodiments, the surface 118 of the rain collector 102 may be generally hydrophilic in configuration (e.g., the surface may include a hydrophilic coating, etc.) to generally wet out the surface 118 of the compartments 110 and to facilitate and/or control water flow through the rain collector 102 (and to the openings 116).

With that said, as rain accumulates in the rain collector 102 (e.g., as rain is collected in the compartments 110 of the rain collector 102, etc.), the rain is permitted to pass through (and/or is directed to) the openings 116 of the rain collector 102. In turn, the rain moves from the upper rain collector 102 and into the drop former 104 disposed below the rain collector 102.

Figure 5:
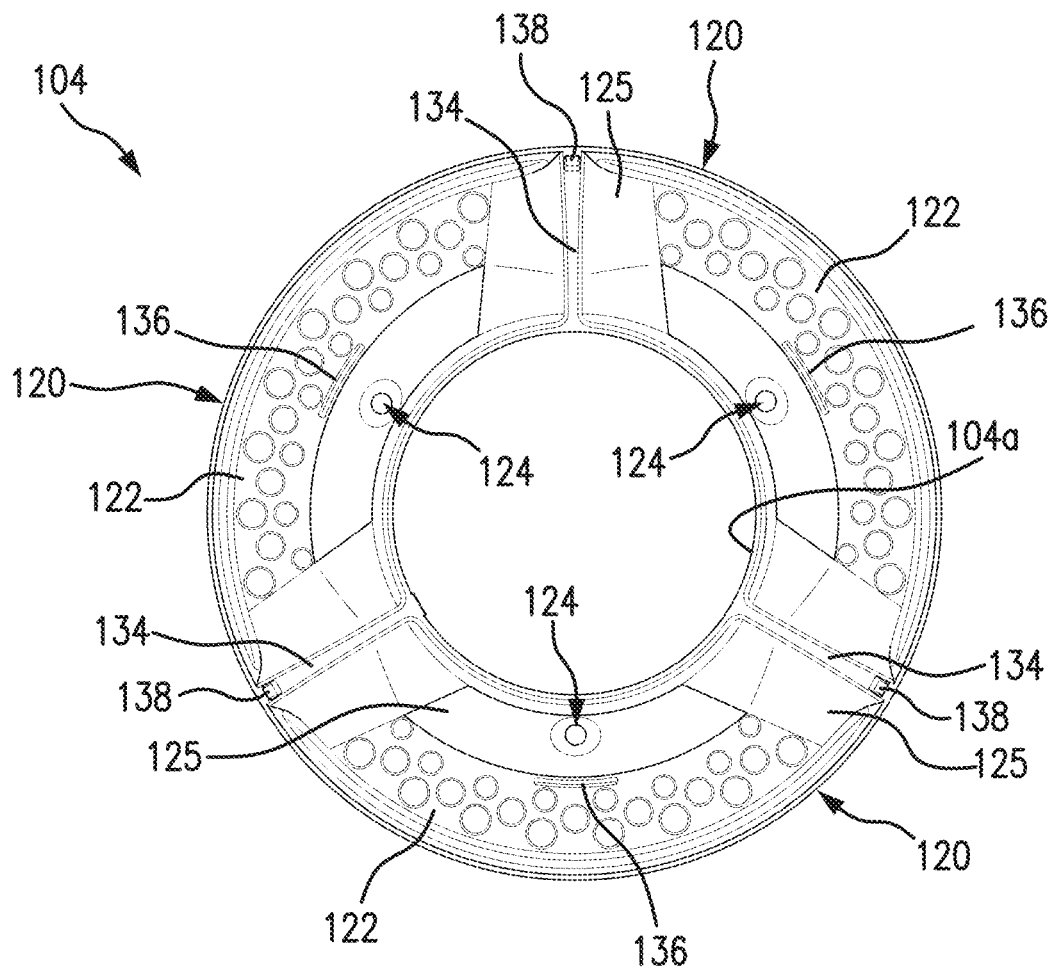
FIG. 5 is a top view of the lower basin of the rain gauge of FIG. 2.
Figure 6:
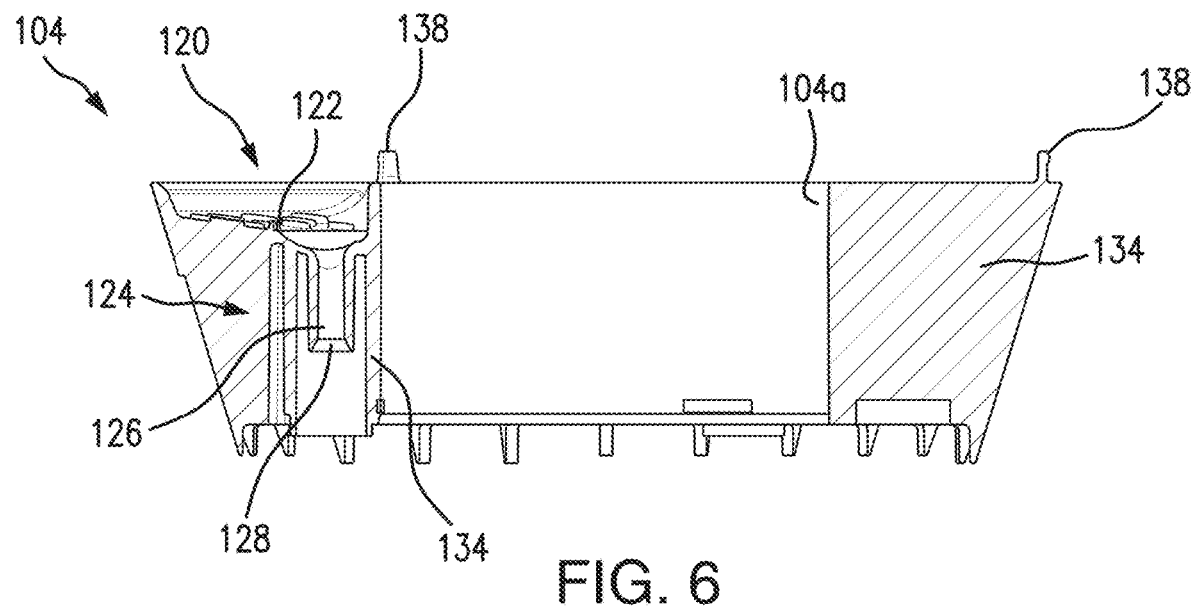
FIG. 6 is a section view of the lower basin of FIG. 5.
Figure 8:
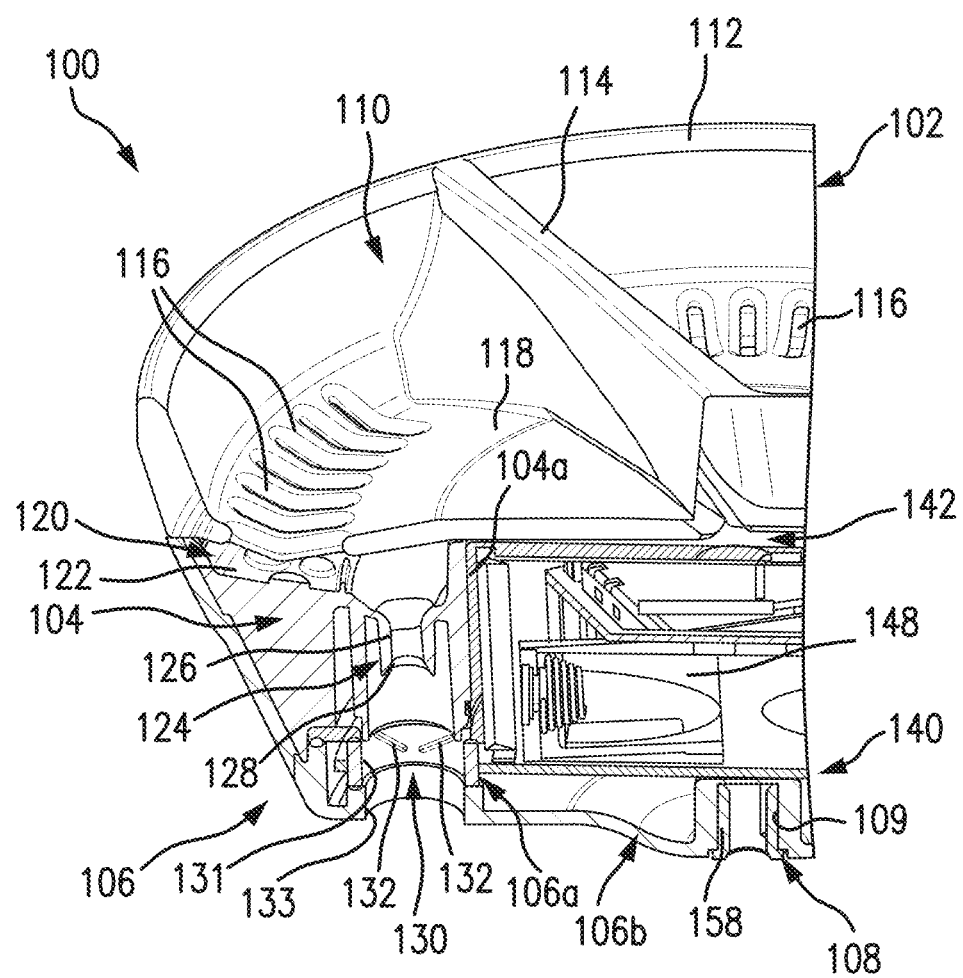
FIG. 8 is an enlarged fragmentary section view of the rain gauge of FIG. 2, further illustrating internal components of the rain gauge including a seal around a perimeter of the rain gauge.

With additional reference now to FIGS. 5 and 6, the drop former 104 in the illustrated embodiment is generally annular in shape and includes multiple compartments 120 which correspond (e.g., in one or more of size, shape, location, etc.) to, and which generally align with, the compartments 110 of the rain collector 102 (FIG. 8). The compartments 120 are generally defined by (and/or are separated by) protrusions 134 (broadly, dividers) which extend generally across the drop former 104 from an inner edge (e.g., from a central opening 104*a* of the drop former 104, etc.) to an outer edge of the drop former 104. By this construction, rain that is collected in the compartments 110 of the rain collector 102 is received into the corresponding compartment 120 of the drop former 104 therebelow, through the openings 116 of the rain collector 102.

In particular in the illustrated embodiment, the rain is received from the rain collector 102 onto an inner surface 122 of each of the compartments 120 of the drop former 104 (FIG. 8). The surface 122 of the drop former 104 is generally vertically aligned with the openings 116 of the rain collector 102, such that the rain that flows from the rain collector 102 (through the openings 116) and into the drop former 104 initially contacts (or falls onto) the surface 122 as the rain is received into the drop former 104 (FIG. 8). The surface 122 is also textured to control the flow of rain through the drop former 104 (from the rain collector 102) and/or to inhibit debris (e.g., trap debris such as dust, dirt, etc.; etc.) from flowing through the drop former 104. This may also facilitate removal/cleaning (e.g., self-cleaning, etc.) of the surface 122 and drop former 104. In the illustrated embodiment, for example, the texture of the surface 122 includes multiple rounded protrusions (e.g., circular, not circular, etc. protrusions, etc.; pebble-type texture such as a pebble mat, etc.) extending upward from the surface 122. However, it should be appreciated that the surface 122 may include other (or additional) textures in other embodiments, similarly configured to control the flow of rain through the drop former 104 and/or to inhibit debris from flowing through the drop former 104, including without limitation, natural textures such as jagged, naturally-formed crevasses, sloping crevasses, ridges over curved contours, offset protrusions (e.g., square protrusions, round protrusions, etc.), linear dashed channels, etc. Additionally, in some embodiments the surface 122 of the drop former 104 may also (or alternatively) be sandblasted (e.g., to roughen the surface, to add microtexture, etc.) to further inhibit the flow of debris through the drop former 104 and/or add a hydrophilic property or characteristic to the surface 122. Further, in some embodiments, the surface 122 of the drop former 104 may also be generally hydrophilic in configuration via other applications (e.g., the surface 122 may include a hydrophilic coating, etc.), or instance, to generally wet out the surface 122 of the compartments 120 and to facilitate and/or control water flow through the drop former 104.

While the illustrated drop former 104 includes three compartments 120, the drop former 104 may include greater or fewer than three compartments in other embodiments. For example, the drop former 104 may include two compartments, one compartment, four compartments, six compartments, ten compartments, more than ten compartments, etc., depending on a number of compartments included in the rain collector 102, a number and/or type of openings 116 in the rain collector 102, etc.

With continued reference to FIGS. 5 and 6, each compartment 120 of the drop former 104 includes a nozzle 124 (broadly, an outlet) configured to form droplets from the rain that enters the compartment 120 from the rain collector 102. Each nozzle 124 is formed generally in a bottom portion of the drop former 104. In connection therewith, the surface 122 of the drop former 104 in each of the compartments 120 (and more generally, each of the compartments 120 themselves) is generally angled towards the corresponding nozzle 124 in the compartment to direct the rain towards the nozzle 124. In addition, channels 126 are also generally defined within each of the compartments 120 to help direct the rain towards the nozzle 124 of the given compartment 120. The nozzle 124 of each compartment 120, then, includes (or defines) a channel 126 to facilitate the flow of rain through the channel 126 (and more generally through the nozzle 124) and towards a discharge 128. When the rain reaches the discharge 128, the nozzle 124 is configured to release the rain from the discharge 128 as a droplet. In addition in the illustrated embodiment, based on a geometry and size of the nozzle 124 (and a geometry and size of the channel 126 and the discharge 128 and the relationship there between), each droplet released from the nozzle 124 of the drop former 104 is generally of a uniform and consistent volume and/or size. For example, for a given temperature (e.g., as may be recorded by a thermometer or other temperature measuring device of (or associated with) the rain gauge 100, or as may be obtained from a weather service, or as otherwise may be obtained, etc.) and rain rate, each droplet released by the nozzles 124 of the drop former 104 is of a consistent volume, such that an amount (and/or rate) of rain may be extrapolated based on a number of droplets that are released from one or more of the nozzles 124 for a given time. In the illustrated embodiment, each compartment 120 of the drop former 104 is shown as including one nozzle 124 (whereby the illustrated drop former 104 includes three total nozzles 124). It should be appreciated, though, that in other embodiments one or more of the compartments 120 may include more than one nozzle 124.

With that said, the channel 126 of each of the nozzles 124 is generally angled or tapered such that a diameter of the channel 126 increases along its length from top to bottom (e.g., at an angle of about 1 degree, at an angle of about 2 degrees, at an angle of about 3 degrees, at an angle of about 5 degrees, etc.), to facilitate the flow of rain through the channel 126 towards the discharge 128 (e.g., the diameter of the channel 126 is generally larger at the lower outlet end portion of the channel 126 adjacent the discharge 128 as compared to the diameter at an upper inlet end portion of the channel 126, etc.). The discharge 128, then, further includes a beveled inner surface (e.g., an enlarged diameter as compared to the channel 126, etc.), which (together with the angled/tapered configuration) facilitates the release of the rain from the nozzle 124 as a droplet. In some embodiments, the discharge 128 (e.g., the beveled inner surface of the discharge 128, etc.) may further be hydrophobic in configuration (e.g., the discharge 128 may include a hydrophobic coating, etc.) to encourage the rain to be released from the nozzle 124. In one example embodiment, and without limitation, the channel 126 may have a diameter adjacent the discharge 128 of about 4.25 mm (about 0.167 inches), whereby a single droplet of rain may be routinely released from the nozzle 124 (e.g., as opposed to double droplets or triple droplets, potentially, if larger diameters are used in which cohesive forces may cling to the droplets and stretch them to form teardrops where top portions of the teardrops ricochet and create smaller double drops; etc.).

The drop former 104 additionally includes a stopper 136 (FIG. 5) disposed in each of the compartments 120, for example, to inhibit debris from flowing into the nozzles 124 and also to inhibit a rush of rain water from flowing into the nozzles 124 (e.g., from surface 122, etc.). In the illustrated embodiment, the stopper 136 in each of the compartments 120 includes a generally rectangular protrusion positioned adjacent to the nozzle 124 of the compartment 120. In this arrangement, the stopper 136 is configured to direct the rain received in the compartment (from the rain collector 102) toward the side(s) of the stopper 136 (and thus to the sides of the nozzle 124) as well as to collect debris included in the rain (e.g., as collected in the rain gauge 100, etc.) to prevent the debris from flowing directly into the nozzle 124. It should be appreciated that the stopper 136 may include other shapes and/or configurations in other embodiments, while still functioning to inhibit debris from flowing into the nozzles 124.

As described above, the drop former 104 is configured to couple to the rain collector 102 generally therebelow. To do so, in the illustrated embodiment, the drop former 104 includes multiple latches 138 (FIGS. 5 and 6) to couple the drop former 104 to the rain collector 102. In particular, the latches 138 releasably engage with (e.g., snap-fit onto or into, etc.) a lower surface of the rain collector 102 to thereby facilitate coupling of the drop former 104 generally under (or below) the rain collector (as shown in FIG. 3). It should be appreciated that the drop former 104 may be coupled to the rain collector 102 in other manners and/or by other configurations, for example, via ultrasonic welds, other fasteners, etc. in other embodiments.

In some embodiments, the rain gauge 100 may include only one basin instead of both an upper basin (e.g., the rain collector 102, etc.) and a lower basin (e.g., the drop former 104, etc.). In these embodiments, the upper basin (e.g., the rain collector 102, etc.), for example, may be omitted. In still other embodiments, additional basins may be included in the rain gauge 100 (e.g., in vertical alignment with the rain collector 102 and the drop former 104, etc.). That said, it should be appreciated that the rain gauge 100 may include a greater or lesser number of basins than illustrated in order to guide the flow of water through the rain gauge 100, as long as at least one of the basins includes an outlet (or multiple outlets) configured to form droplets of rain (e.g., nozzle 124, etc.).

Figure 7:
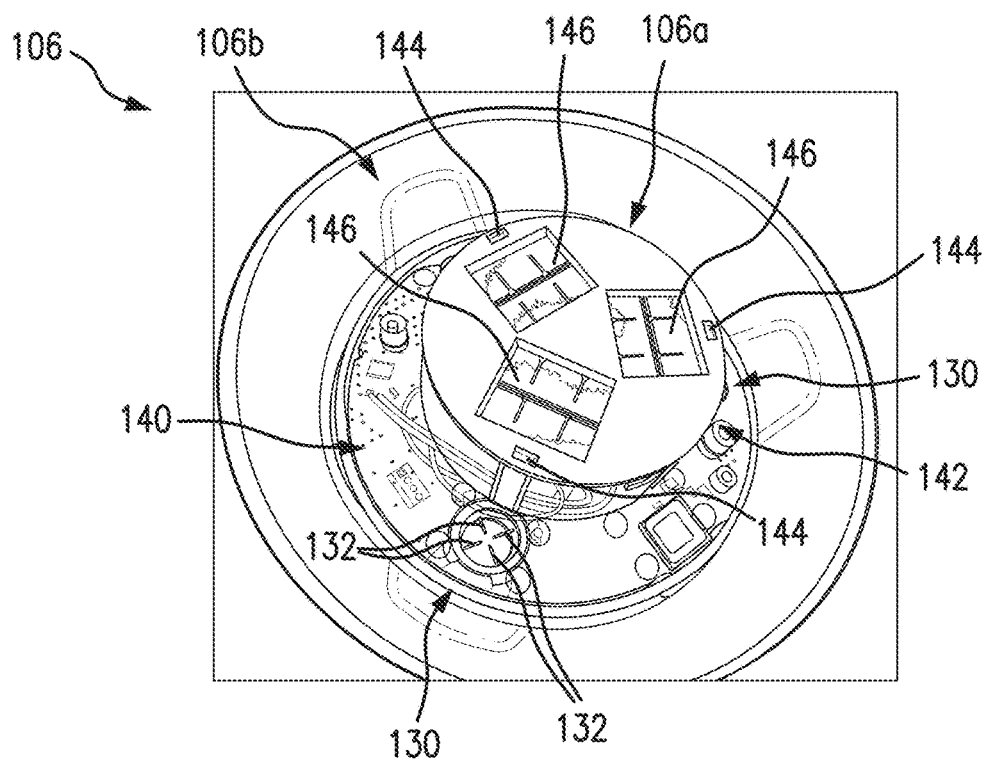
FIG. 7 is a top perspective view of the rain gauge of FIG. 2 with the upper basis and the lower basin removed to illustrate the housing and internal components of the rain gauge.
Figure 9:
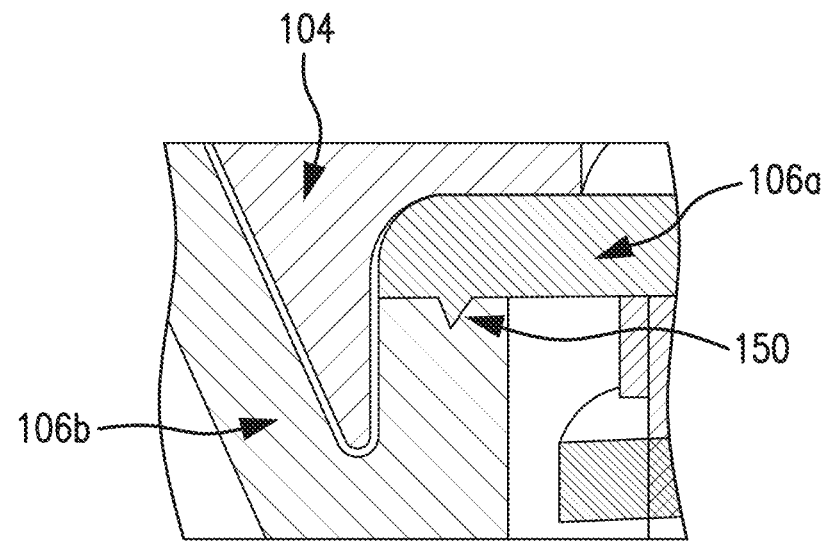
FIG. 9 is an enlarged fragmentary section view of the rain gauge of FIG. 8, further illustrating the seal around the perimeter of the rain gauge.
Figure 10:
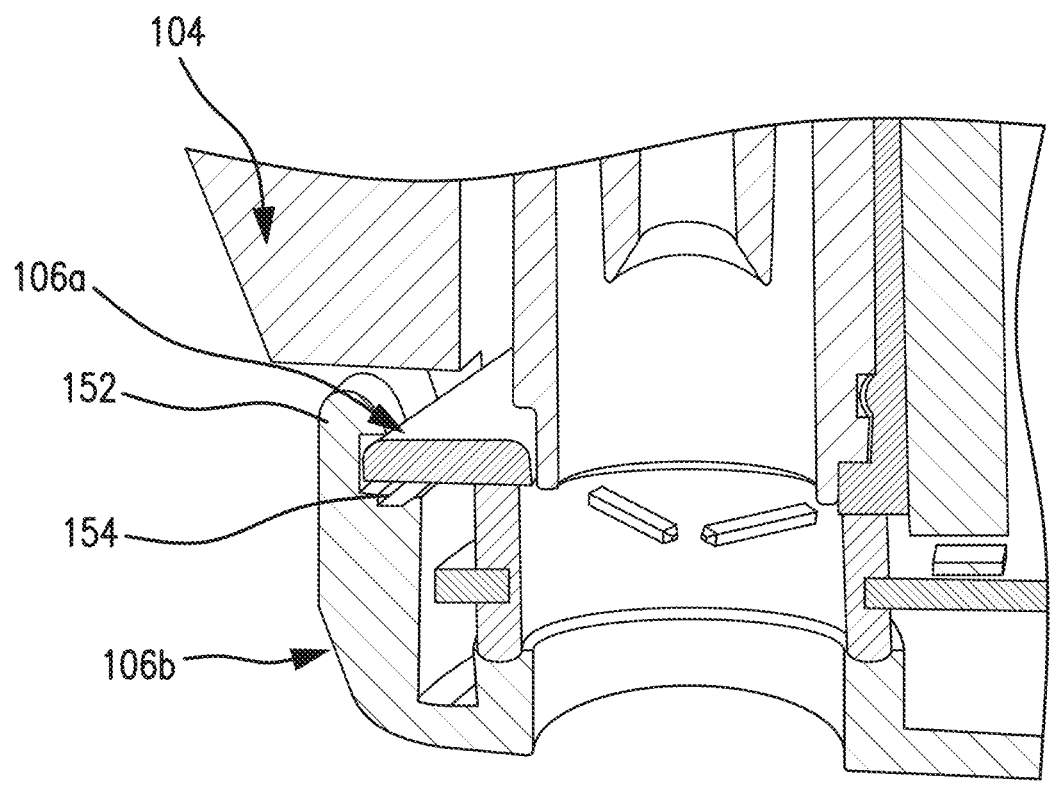
FIG. 10 is an enlarged fragmentary section view of the rain gauge of FIG. 2, illustrating an alternative embodiment of a seal around a perimeter of the rain gauge.

Referring now to FIGS. 7-9, the housing 106 of the rain gauge 100 generally includes an inner (or first) section 106a, and an outer (or second) section 106b coupled to the inner section 106a. In some examples, the inner section 106a may couple to the outer section 106b via a weld 150 (FIG. 9) (e.g., an ultrasonic weld, etc.). Alternatively, in other examples, the outer section 106b may include latches 152 configured to engage with (e.g., snap onto, etc.) an edge of the inner section 106a to thereby snap-fit the inner section 106a and the outer section 106b together (FIG. 10). In these later examples, a gasket (e.g., a rubber gasket, a metal gasket, etc.) may be positioned in channel 154 between the inner section 106a of the housing 106 and the outer section 106b of the housing 106 to help seal the housing 106.

The inner section 106a of the housing 106 is configured to house the various electronics of the rain gauge 100 (as described herein), and the outer section 106b is configured to generally cover the inner section 106a and couple the housing 106 (and drop former 104 and rain collector 102) to the support 108. In connection therewith, the housing 106 is configured to couple to the drop former 104 (e.g., via a snap-fit connection, via an ultrasonic weld, etc.) with a portion of the inner section 106a disposed generally within the central opening 104a of the drop former 104 and with the outer section 106b disposed generally below and generally around the drop former 104 (see, also, FIG. 3, etc.). In this fashion, the drop former 104 and the housing 106, then, are generally positioned below the rain collector 102 with the drop former 104 positioned at least partially in the outer section 106b of the housing 106 (such that the drop former 104, more generally, disposed within the housing 106 with the rain collector 102 generally disposed thereover). What's more, this configuration of the drop former 104 and the housing 106 (e.g., with the drop former 104 and the inner section 106a of the housing 106 disposed generally within the outer section 106b, etc.) also provides protection to the droplets formed by the drop former 104, for example, from wind, etc. thereby inhibiting (or minimizing) disturbance to the droplets formed by the nozzles 124 and released to the inner section 106a of the housing, etc.

The inner section 106a of the housing 106 includes multiple sensors 130 (FIGS. 7 and 8) each configured to detect a water droplet from the drop former 104. Each sensor 130 is positioned generally within an opening 131 defined by (and extending through) the inner section 106a of the housing 106, to allow the droplet to be detected by the sensor 130 as the droplet passes through the opening 131 and out of the rain gauge 100 (via opening 133 defined by the outer section 106b). In connection therewith, each sensor 130 corresponds to one of the nozzles 124 of the drop former 104. In particular, each sensor 130 (as well each of the openings 131, 133) is generally vertically aligned with one of the nozzles 124 and is positioned generally below the nozzle 124 in order to detect a droplet released by the nozzle 124 of the drop former 104 (FIG. 8). When a droplet is released by the drop former 104, it is directed (or falls, etc.) into the opening 131 whereby the sensor 130 (within the opening 131) detects the droplet as the droplet contacts the sensor 130. The droplet then moves past the sensor 130 and exits the rain gauge 100 through the opening 131 of the outer section 106b.

In the illustrated embodiment, the rain gauge 100 includes three sensors 130 disposed generally uniformly around the housing 106 (FIG. 7). It should be appreciated, though, that a greater or lesser number of sensors 130 may be included within the rain gauge 100 in other embodiments (e.g., two sensors, four sensors, six sensors, greater than six sensors, etc.) depending, for example, on a number of compartments 110 included in the rain collector 102, a number of compartments 120 included in the drop former 104, a number of nozzles 124 included in the drop former 104, etc. In addition, in some embodiments, where, for example, the rain gauge 100 includes multiple sensors 130, at least one of the multiple sensor 130 may be a redundant sensor, such that the rain gauge 100 may still detect droplets of rain even if there is an error with another one of the multiple sensors 130 (e.g., where another one of the sensors 130 malfunctions, where a nozzle 124 of the drop former 104 and/or an opening 116 of the rain collector 102 generally aligned with one of the sensors 130 becomes clogged, etc.).

In the rain gauge 100 herein, the sensors 130 rely on conductive technology to detect the droplets that are released from the drop former 104. In particular, each of the sensors 130 includes a plurality of electrically conductive prongs or pins 132 (broadly, electrical contacts) configured to detect the presence of a water droplet received from the corresponding nozzle 124 of the drop former 104. In the illustrated embodiment, for example, each sensor 130 includes a set of four electrically conductive pins 132 positioned within the corresponding opening 131 defined by the inner section 106a of the housing 106 (e.g., to allow the droplet to be detected as the droplet passes through the opening 131 and through the sensor 130 and out of the rain gauge 100, etc.). The pins 132 are separated by about 90 degrees and are spaced apart at a distance sufficient to prevent the pins 132 from contacting each other, while also allowing a droplet to contact two or more pins 132 simultaneously when present (e.g., a spacing of about three millimeters, about two millimeters, about one millimeter, about five millimeters, etc.). While four pins 132 are shown in the illustrated embodiment, a greater or lesser number of pins 132 may be included in each of the sensors 130 without departing from the scope of the present disclosure. For example, as few as two pins 132 may be included in the sensor 130 as a droplet would cause the two pins 132 to short (and allow a droplet to be detected), although having a greater number of pins 132 may increase the likelihood that the droplet will be detected (e.g., the droplet is more likely to actually contact at least two pins 132 of the sensor 130, etc.). That said, it should be appreciated that in other embodiments one or more sensor(s) of the rain gauge 100 may include more than or less than four conductive pins 132 (e.g., two pins, three pins, five pins, etc.) configured to detect a droplet of rain in the manner described above, as the droplet passes through the sensor (and through the rain gauge 100).

In connection with the above, a droplet of rain is detected by each of the sensors 130 when the droplet contacts (e.g., at the same time, etc.) two or more of the pins 132 of the given sensor 130 (e.g., the droplet contacts a pair of adjacent pins 132, etc.), forming a closed circuit (e.g., the contacted pins 132 are shorted, etc.). And, a droplet is counted each time a closed circuit is created by a droplet in the sensor 130 (e.g., when the droplet contacts two or more pins 132, etc.). Once detected and counted, the droplet passes through the opening 133 of the outer section 106b of the housing 106 (as aligned with the opening 131 of the inner section 106a of the housing 106) to permit the droplet to flow out of the rain gauge 100 (e.g., such that rain is not accumulated within the rain gauge 100, etc.).

Each droplet detected by the sensors 130 is counted and converted into an amount (e.g., a volume, etc.) of rain by the rain gauge 100. In connection therewith, the housing 106 further includes a processor 140 (broadly, a computing device) communicatively coupled to the sensors 130. The processor 140 is configured to receive a signal (broadly, an indication of rain) from each of the sensors 130 when a droplet is detected at the given sensor 130 and is configured to count the detected droplets of rain (broadly, maintain a record of the detected droplets including, for example, a total number for a desired time period, a time at which the droplet was detected, etc.). In particular, the processor 140 is configured to receive a signal that a closed circuit has formed between the pins 132 of the sensor 130 when a droplet of rain contacts the pins 132. The processor 140 is configured to then convert the counted droplets into an amount of rain (e.g., a volume, etc.), for example, using environmental variables, including, without limitation, temperature, rain rate, etc. (e.g., via an algorithm, via a lookup table correlating rain rate and/or droplets counted with an amount of water collected for a given configuration of the nozzle 124, etc.). That said, in other embodiments, the sensors 130 may utilize other configurations (e.g., other than electrically conductive pins 132, etc.) to detect droplets including, for example, laser direct sintering (LDS) technology, imaging technology (whereby images of droplets may be captured and counted), etc.

In addition, or alternatively, to calculating an amount of rain, other rain data may also be calculated by the processor 140, including without limitation, a total amount of rain for a given rain event, a total amount of rain for a desired period of time (e.g., an hour, a day, a week, a month, a year, etc.), a rain rate for a desired period of time, etc. As such, rain data may include any indication of rain, including without limitation, an indication that a droplet has been detected, a count of detected droplets, an amount (e.g., volume, etc.) of rain, a rate of rain, a total amount of rain for a given period of time, etc. In connection therewith, the rain gauge 100 may store the rain data in a repository (e.g., in a remote database, in a local database in the housing 106, etc.) and/or transmit the rain data to a user for presentation to the user (e.g., in a graphical format, etc.). It should be appreciated that in some embodiments, the user may receive an indication of rain such as an indication that a droplet has been detected and/or a count of the detected droplets from the rain gauge 100 and the user may then determine, calculate, and/or extrapolate rain data (e.g., an amount of rain, a rate of rain, etc.) from the received indication of rain, using a separate user computing device, without the rain gauge 100 calculating such rain data.

The rain gauge 100 additionally includes one or more transceivers (not shown) disposed, for example, in the housing 106. The one or more transceivers are communicatively coupled to the processor 140 and are configured to transmit and receive data (e.g., rain data, other data as described herein, messages, etc.) to/from a user's communication device (e.g., communication device 604 of user 602 in system 600 of FIG. 19, etc.), to/from other rain gauges 100 over a network (e.g., in field 605 of system 600, etc.), to/from a repository for storing such data (e.g., repository 660 in system 600 for subsequent use as part of field data 606, etc.). For example, the rain gauge 100 may include an antenna, a radio frequency transceiver, a wireless transceiver, a Bluetooth transceiver, an Ethernet port, a universal serial bus (USB) port, or any other device configured to transmit and receive data. In connection therewith, then, the processor 140, via the transceiver, may be configured to send a notification to a user when a rain event is detected (e.g., based on an initial detection of a droplet by the sensor 130, etc.) using, for example, cellular connectivity between the rain gauge 100 and a computing device associated with the user. Then, during a rain event (e.g., during a continuous period of rain, etc.) (e.g., between a start of the given rain event and an end of the given rain event, etc.), subsequent rain data may be transmitted to the user, for example, continuously during the rain event, at a desired interval (e.g., every 15 minutes, etc.) during the rain event, at completion of the rain event, etc. Alternatively, following initial detection of a rain event, if no additional rain is detected, and/or if the rain is not continuous after initial detection, and/or if the rain event is shorter than the interval, rain data may be transmitted to the user at an interval of a longer duration (e.g., 24 hours, etc.). That said, regardless of the type of rain event, rain data may be transmitted to the user at other intervals or periods, for example, based on the user's preferences, etc. Further, the rain gauge 100 may be configured to communicate (e.g., using Bluetooth® connectivity, cellular connectivity, etc.) with other rain gauges 100 included in a rain gauge network (e.g., positioned within a field, etc.) to determine, calculate, and/or extrapolate additional rain data over the network (e.g., over the entire field, etc.). This additional rain data may also be transmitted by the rain gauge 100 (as a centralized data provider for the network) to the user, or by each of the rain gauges in the network to the user. In the illustrated embodiment, the sensors 130 of the rain gauge 100 are disposed generally above the processor 140. In other embodiments, the sensors 130 may instead be positioned below the processor 140.

With continued reference to FIGS. 7 and 8, the inner section 106a of the housing 106 further includes a central compartment 142 (e.g., a clear waterproof enclosure, etc.) configured to house the processor 140, along with multiple indicators 144 (e.g., LED indicators, etc.), multiple solar panels 146, and a battery 148.

The indicators 144 of the housing 106 are positioned generally toward a top of the compartment 142 and are configured to provide one or more indications about the functionality of the rain gauge 100. The indicators 144, for example, may be configured to alert a user of the rain gauge 100 when one of the sensors 130 is malfunctioning and/or is functioning differently than the other sensors 130 by illuminating when such a malfunction occurs (e.g., the particular indicator 144 adjacent the malfunctioning sensor 130 may illuminate, etc.). Additionally when one of the indicators 144 is activated, or alternatively, the rain gauge 100 may be configured to transmit an alert message to the user (e.g., via cellular connectivity, etc.) indicating that the rain gauge 100 and/or a component thereof is malfunctioning. In the illustrated embodiment, the rain gauge 100 includes three indicators 144 that correspond to each section of the rain gauge 100. As such, one indicator 144 may indicate an issue associated with the corresponding section of the rain gauge 100 (e.g., a clog of one of the nozzles 124, a sensor malfunction, etc.).

The solar panels 146 of the housing 106 are also positioned generally toward the top of the compartment 142 and are configured to charge the battery 148 included within the housing 106. The battery 148, as charged by the solar panels 146, then, is configured to power the electronic components of the rain gauge 100 (e.g., the processor 140, the indicators 144, the sensors 130, etc.). It should be appreciated that other means for powering the rain gauge 100 may be included, for example, within the housing 106, within the scope of the present disclosure.

And, the support 108 (FIG. 8) of the rain gauge 100 includes a fastener 158 (e.g., a threaded screw member, etc.) configured to couple the support 108 to the housing 106. In particular in this embodiment, the fastener 158 of the support 108 is configured to fit within a corresponding opening 109 (e.g., a threaded opening, etc.) defined in a bottom portion of the outer section 106b of the housing 106 (FIG. 8). Once coupled to the housing 106, the support 108 is then configured to support the rain collector 102, the drop former 104, and the housing 106 as needed, for example, above the ground in a field (e.g., on the post 156, etc.), etc. for use as described herein.

From the above, it can be seen that the rain gauge 100 is divided generally into three sections (e.g., as defined by the compartments 110 of the rain collector and the compartments 120 of the drop former, etc.) through which rain flows through the rain gauge 100. For example, each section includes one of the compartments 110 of the rain collector 102, one of the compartments 120 of the drop former 104, and one of the sensors 130 included in the housing 106. These sections are generally separate, or generally self-contained, such that rain that is accumulated in one compartment 110 generally flows through the rain gauge 100 through its corresponding compartment 120 and sensor 130 (e.g., in a generally vertical pathway). It should be appreciated that the rain gauge 100 may be divided into a greater or lesser number of sections without departing from the scope of the present disclosure.

While the above description of the rain gauge 100 is made in connection with the rain gauge 100 receiving rain from a rain event (and monitoring, measuring, etc. rain associated with the rain event), it should be appreciated that the rain gauge 100 may also be used to collect moisture from an irrigation event, for example, to monitor, measure, etc. moisture (e.g., water, etc.) directed to a field by an irrigation system, etc. (as part of the irrigation event). That said, the above description of the rain gauge 100 remains the same regardless of whether the moisture event is a rain event, an irrigation event, or another moisture event.

Further, it should also be appreciated that the rain gauge 100 may include (or may be in communication with) one or more additional sensors (e.g., in addition to sensors 130, etc.) configured to measure, monitor, etc. other features, aspects, etc. of an environment around the rain gauge 100. For example, in some embodiments, the rain gauge 100 may additionally include, or may be in communication with, one or more of thermometers, humidistats, barometers, seismic sensors, UV sensors, microphones, motion sensors (e.g., infrared (IR) motion sensors to detect animals, other movements, etc.), IR sensors configured to inspect/monitor crop growing conditions adjacent the rain gauge 100, cameras, wind gauges, etc. In connection therewith, the rain gauge 100 (e.g., the processor 140, etc.) may then be configured to receive such data from the one or more sensors and then to transmit the data (or results associated with the data) to one or more other rain gauges and/or to a user's communication device and/or to the repository 660, etc. The one or more sensor(s) may be physically included in/on the rain gauge 100, or the sensor(s) may be apart from the rain gauge 100 but still in communication therewith (e.g., using Bluetooth® connectivity, cellular connectivity, etc.). As such, the rain gauge 100 may be configured (by way of the processor 140 and transceiver(s) associated therewith) may be configured to process and transmit data such as rain/moisture data (as described herein), location data for the rain gauge 100 (e.g., based on global positioning system (GPS) capabilities integrated into the rain gauge 100, etc.), time data, and any other data provided by with the one or more other sensor(s) associated with the rain gauge 100.

Figure 11:
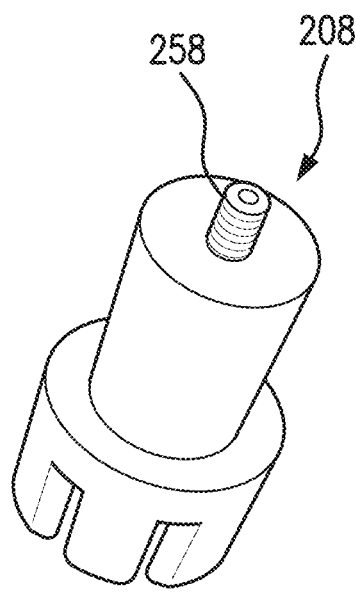
FIG. 11 is a top perspective view of an example embodiment of a support suitable for use with the rain gauge of FIG. 1 or the rain gauge of FIG. 2.
Figure 12:
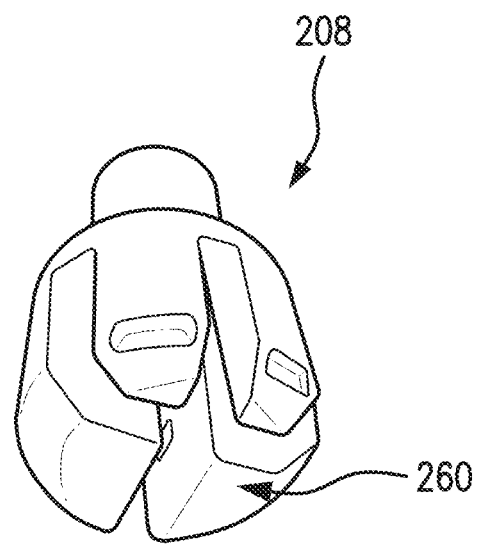
FIG. 12 is a bottom perspective view of the support of FIG. 11.
Figure 13:
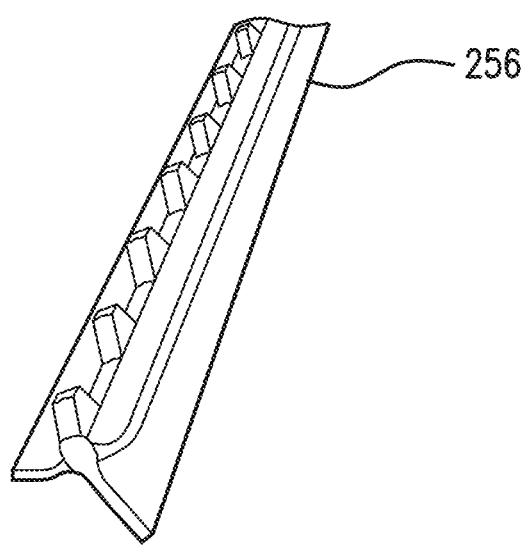
FIG. 13 is a perspective view of a post to which the rain gauge of FIG. 1 or the rain gauge of FIG. 2 may be mounted through the support of FIG. 11.

FIGS. 11-13 illustrate another example embodiment of a support 208 capable of use with the rain gauge 100 of FIGS. 2-9. In connection therewith, the support 208 is configured to couple to the housing 106 of the rain gauge 100 to thereby support the housing 106 (and the rain collector 102 and the drop former 104) thereon. In this example embodiment, the support 208 includes a fastener 258 (e.g., a threaded screw member, etc.) configured to couple the support 208 to the housing 106 (e.g., within the threaded opening 109 defined in the bottom portion of the outer section 106b of the housing 106 (FIG. 8)). And, at an opposite end of the support 208, the support 208 includes a mount 260 (or adapter) (e.g., a T-shaped recess, etc.) configured to receive an end portion of post 256 therein to releasably couple the rain gauge 100 to the post 256 (e.g., via friction, etc.). In FIG. 13, the post 256 is illustrated as a T-post, which may be located in a field or at another location where it may be desirable to monitor moisture as described herein. The mount 260, then, is sized and shaped to receive the T-post 256 therein (e.g., within the T-shaped recess, etc.), or generally fit over the end portion of the T-post 256, such that the support 208 may slide onto the post 256. In this wan, the rain gauge 100 can be positioned generally upright on the post 256, above the ground, and in positon to collect moisture from a moisture event (e.g., from a rain event, from an irrigation event, etc.). It should be appreciated that, in other embodiments, the support 208 may include mounts configured to correspond to posts of other configurations, etc. without departing from the scope of the present disclosure.

Figure 14:
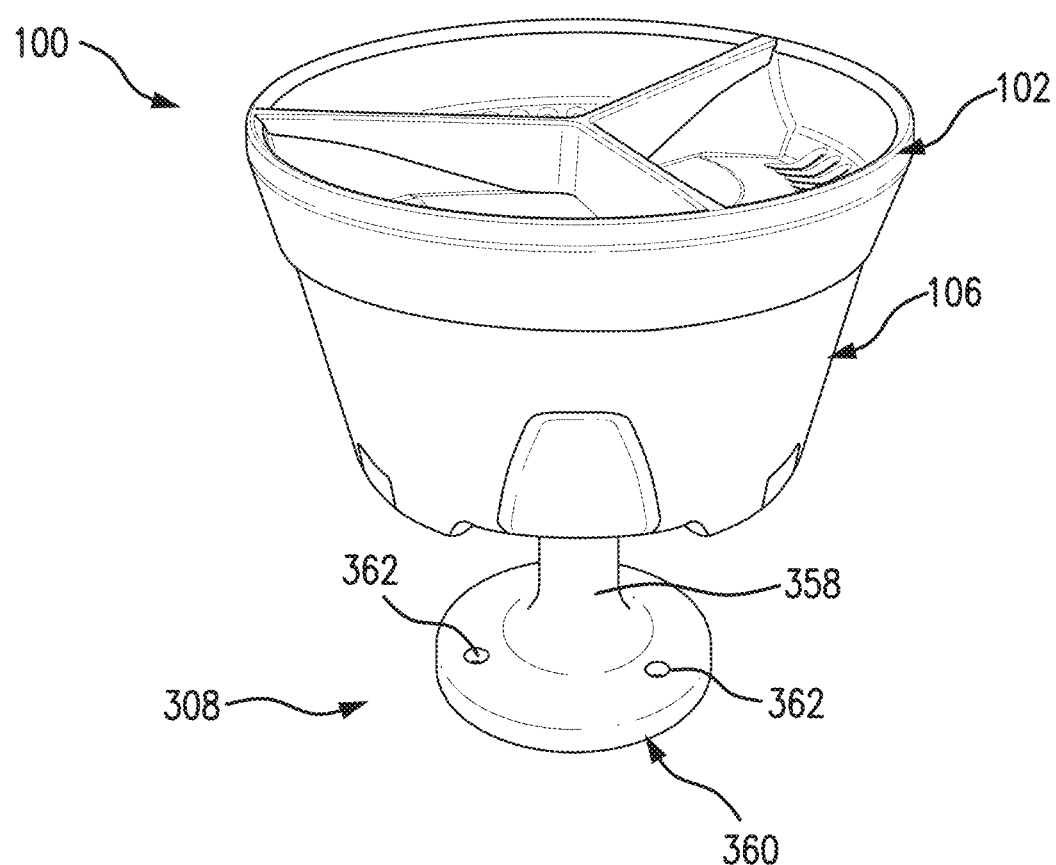
FIG. 14 is a perspective view of another example embodiment of a support suitable for use with the rain gauge of FIG. 1 or the rain gauge of FIG. 2.

FIG. 14 illustrates another example embodiment of a support 308 capable of use with the rain gauge 100 of FIGS. 2-9. In connection therewith, again, the support 308 is configured to couple to the housing 106 of the rain gauge 100 to thereby support the housing 106 (and the rain collector 102 and the drop former 104) thereon. In particular in this embodiment, the support 308, similar to the support 208, includes a fastener 358 (e.g., a threaded screw member, etc.) configured to couple the support 208 to the housing 106 (e.g., within the threaded opening 109 defined in the bottom portion of the outer section 106b of the housing 106 (FIG. 8)). The illustrated support 308 also includes a mount 360 configured to position the support 308 on a generally flat surface (e.g., a table, a stand, etc.). The mount 360 defines a plurality of openings 362, through which fasteners (e.g., nails, screws, etc.) may be used to couple or otherwise secure the support 308 (and rain collector 102, drop former 104, and housing 106 coupled thereto) to the surface.

Figure 16:
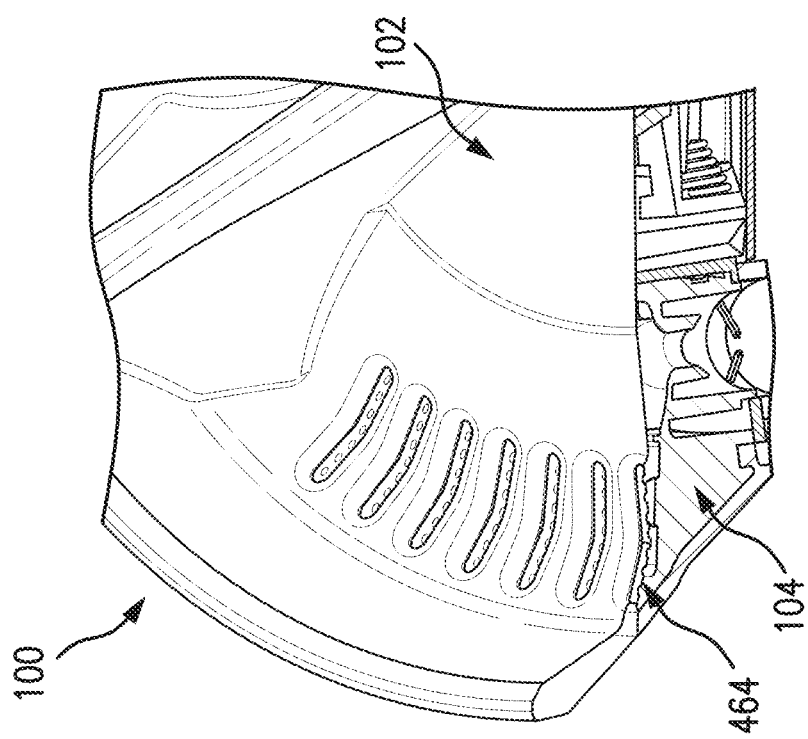
FIG. 16 is an enlarged fragmentary section view of the rain gauge of FIG. 2 including the filter of FIG. 15.
Figure 15:
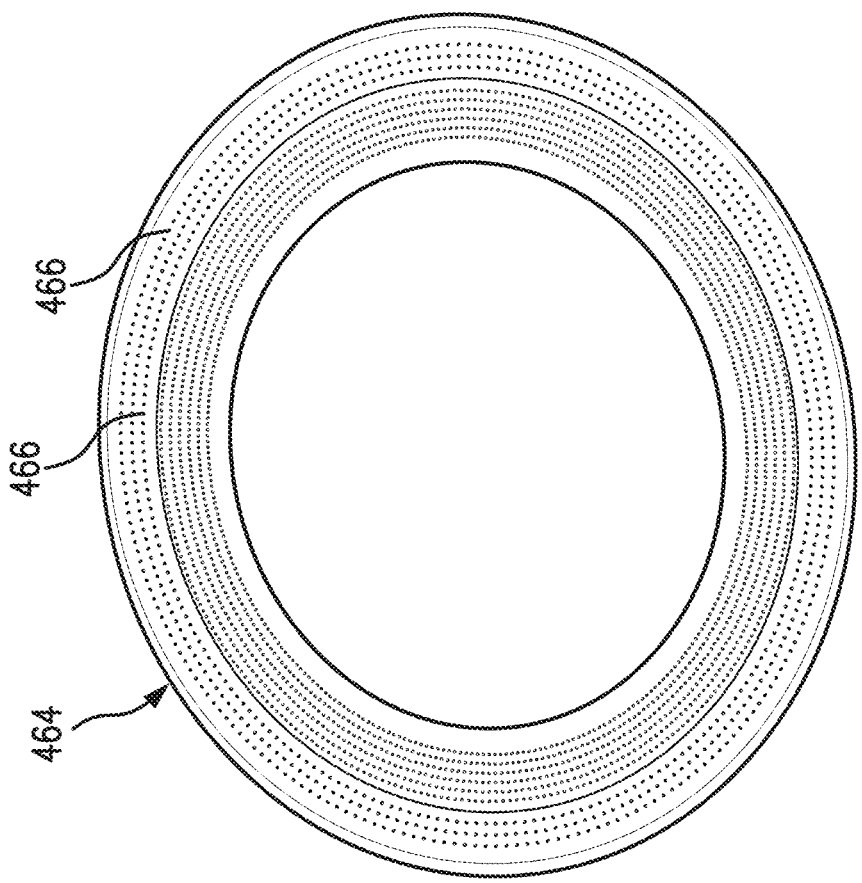
FIG. 15 is a top view of an example embodiment of a filter suitable for use with the rain gauge of FIG. 1 or the rain gauge of FIG. 2.

FIGS. 15-16 illustrate an example embodiment of a filter 464 that may be used with the rain gauge 100. The filter 464 is configured to be disposed between the rain collector 102 and the drop former 104 of the rain gauge 100. The filter 464 is generally annular in shape (generally corresponding to the shapes of the rain collector 102 and the drop former 104) and defines a plurality of openings 466. The openings 466 of the filter 464 are configured to permit rain to pass through the openings 466, but to and inhibit debris from passing therethrough (and potentially clogging or damaging other parts of the rain gauge 100). As shown in FIG. 16, when implemented in the rain gauge 100, the filter 464 is configured to align with the openings 116 of the rain collector 102. In this way, as rain and/or debris is collected in the rain collector 102 and passes through the openings 116 of the rain collector 102, towards the drop former 104, the filter 464 blocks (and/or inhibits) at least some of the debris from entering the drop former 104 with the rain. That said, the filter 464 may be constructed from suitable material such as metal, plastic, combinations thereof, etc. in a mesh configuration, etc.

Figure 17:
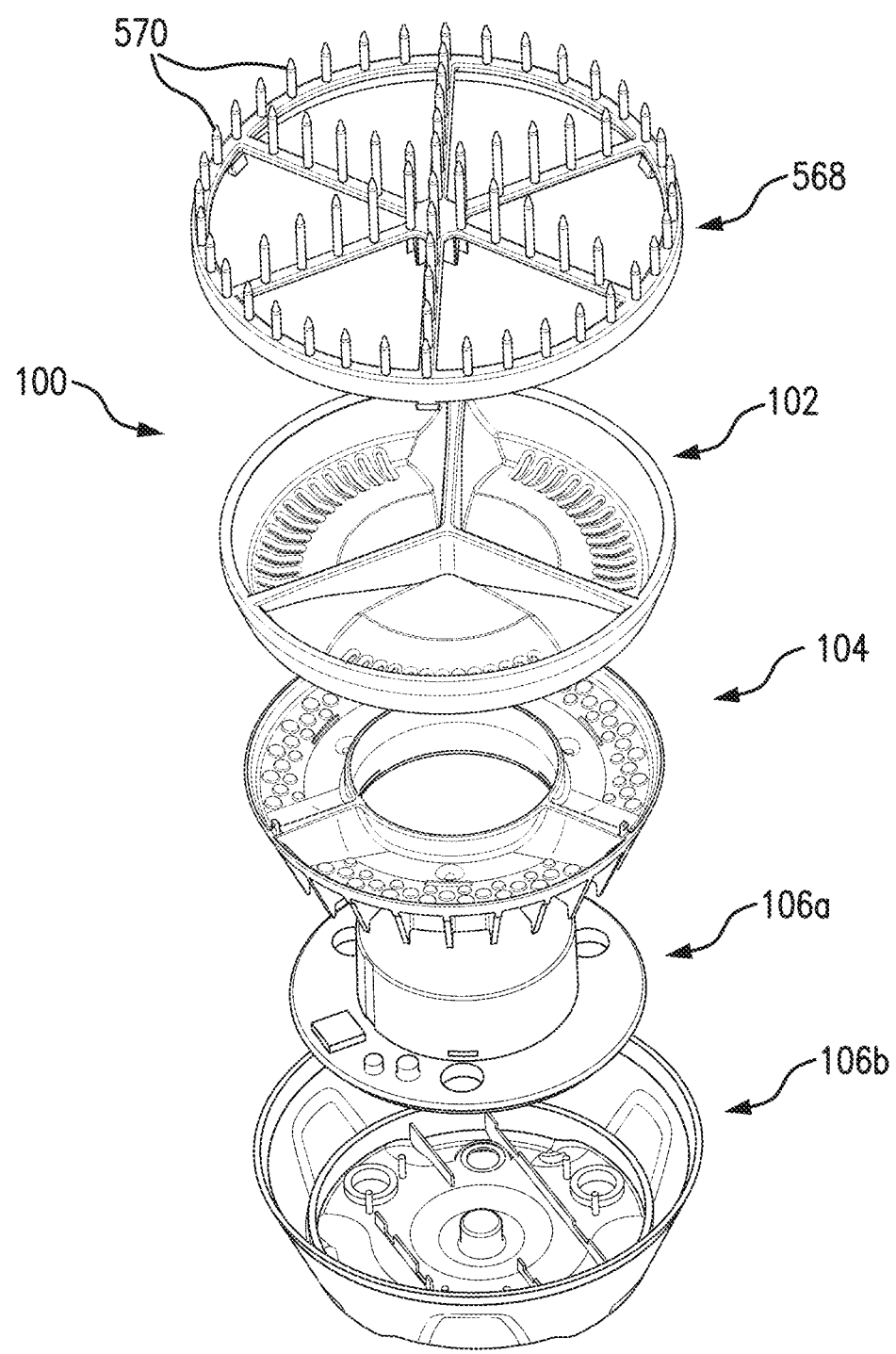
FIG. 17 is an exploded perspective view of the rain gauge of FIG. 2, including an example pest deterrent configured for use with the rain gauge.
Figure 18:
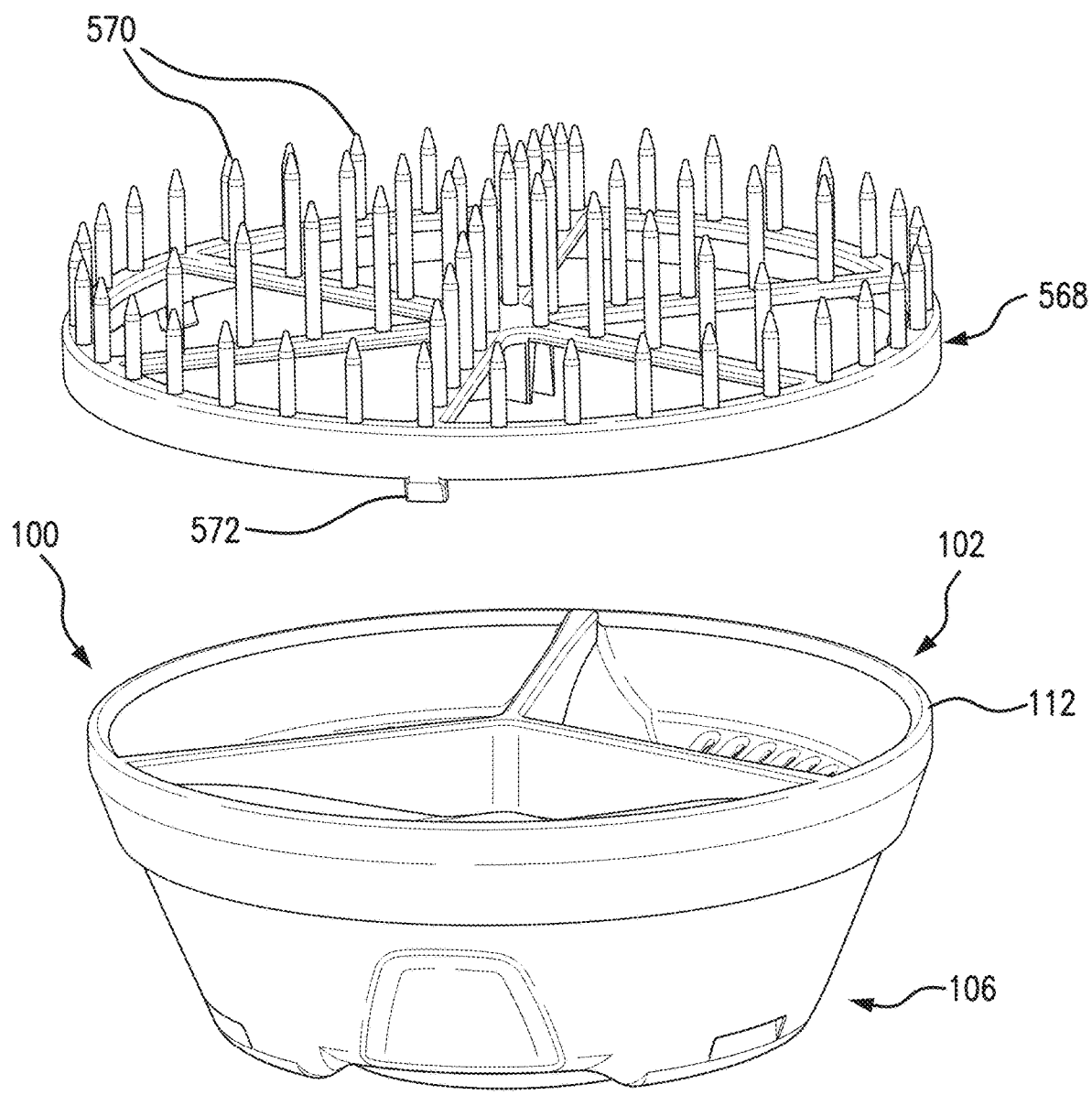
FIG. 18 is a perspective view of the rain gauge and pest deterrent of FIG. 17.

FIGS. 17-18 illustrate an example embodiment of a pest deterrent 568 capable of use with the rain gauge 100 of FIGS. 2-9. The pest deterrent 568 is configured to couple to the rain gauge 100 generally above the rain collector 102 (e.g., at a top portion of the rain gauge 100, etc.). In particular, the illustrated pest deterrent 568 includes latches 172 configured to engage with (e.g., snap onto, etc.) the outer wall 112 of the rain collector 102. The pest deterrent 568, then, includes multiple protrusions 570 (e.g., spikes, posts, barbs, etc.) configured to inhibit or deter pests (e.g., birds, etc.) from contacting, interfering and/or disturbing the rain gauge 100. For example, the protrusions 570 may deter birds from landing on the rain gauge 100.

In some example embodiments, a moisture event may be characterized by its starting and end point in time, number of counted droplets, rain rate (together referred to as parameters of a moisture event). For instance, in an embodiment, start or end of a moisture event may be defined by a predefined number of counted consecutive droplets within a predefined amount of time (e.g., 5 counted droplet per minute, etc.). Additionally, or alternatively, a start of a moisture event may be defined by a first counted droplet received within a predefined time of no counted droplets (e.g., a first counted drop within the last one hour, two hours, six hours, eight hours, one day, etc.), and an end of the moisture event may be defined by a lack of any counted droplets for a predefined time (e.g., the time of the last counted drop after one hour, two hours, six hours, eight hours, one day, etc. with no further counted drops; etc.). The systems and devices herein (e.g., rain gauge 100, etc.), then, may be configured to collect, determine and/or record the parameters of the moisture event. In addition, as described, a moisture event may include one of a precipitation event and an irrigation event. Further, a "rain rate", also called rain intensity as used herein, for example, may refer to ($mm^3$ of rain)/($mm^2$ rain gauge opening area)/(hour)=mm/hr (mm per hour), obtained by dividing the amount of liquid precipitation/fluid by the catchment area (rain gauge opening size) and again dividing by the measurement time.

In some example embodiments, the rain gauge 100 may include a temperature measuring device (e.g., a thermometer, etc.) configured to measure temperature around the rain gauge 100 (e.g., air temperature in an environment around the rain gauge 100, etc.). The rain gauge 100 may then be configured to record, store, etc. the measured temperature (e.g., in memory associated with the rain gauge 100, etc.) and use the measured temperature in one or more calculations, determinations, etc. described herein.

In some example embodiments, in calculating an amount of moisture associated with a given moisture event, the rain gauge 100 (e.g., the processor 140 thereof, etc.) may be configured to convert the counted droplets into an amount of rain (e.g., a volume, etc.), for example, using a lookup table (e.g., stored in memory associated with the rain gauge 100 and/or accessible by the rain gauge 100 and/or associated with a computing device with which the rain gauge 100 is in communication, etc.) correlating rain rate and/or droplets counted with an amount of water collected. The lookup table may be specific to a given configuration of the nozzle 124, and/or may be specific to a given environmental variable such as temperate, etc. As such, based on the configuration of the rain gauge 100 and/or the given temperature at the time of the moisture event (e.g., at the start of the moisture event, at the end of the moisture event, as an average during the moisture event, etc.), the particular lookup table may be identified (e.g., from multiple different lookup tables, etc.) and used in the calculation/determination of moisture amount.

Figure 19:
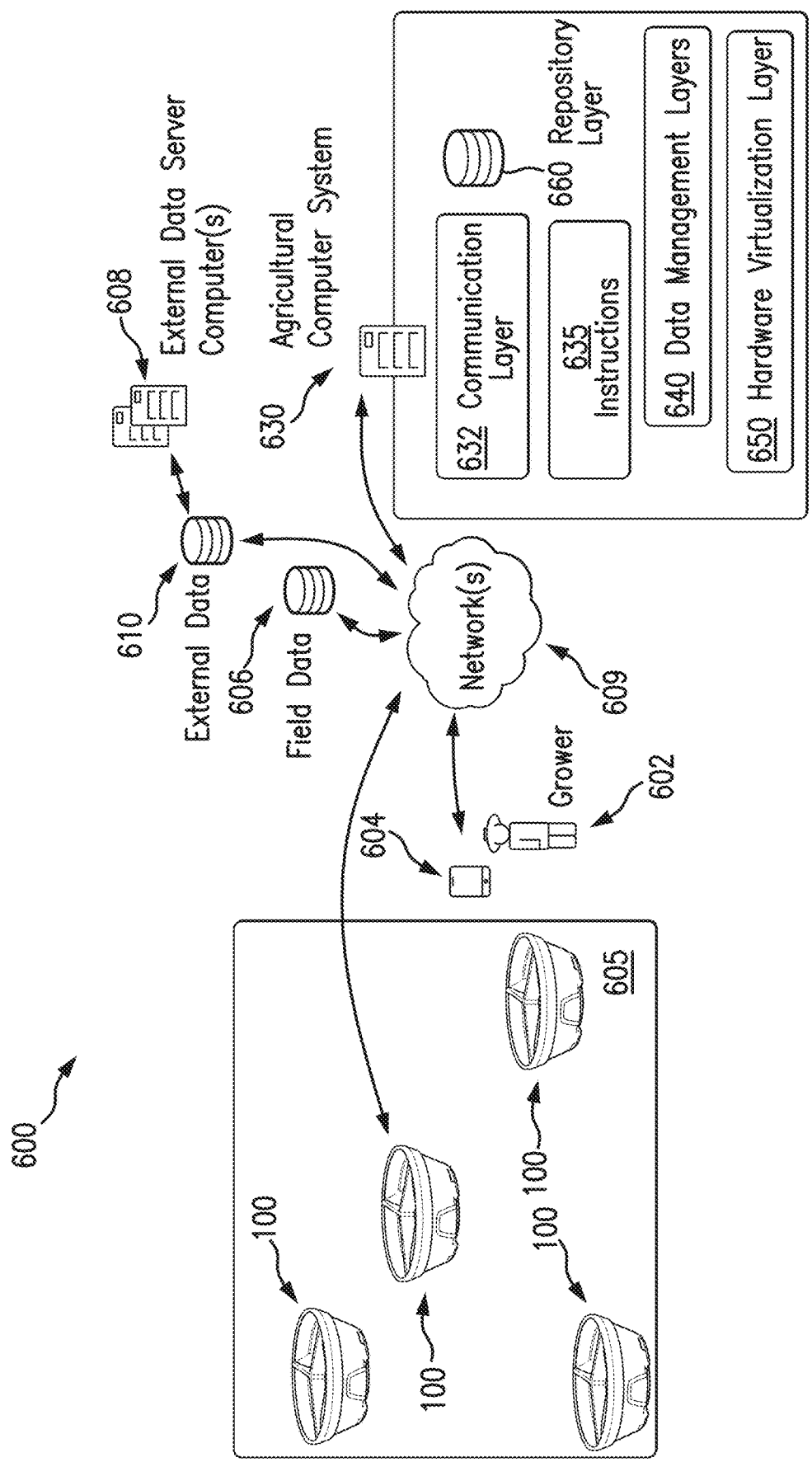
FIG. 19 illustrates an example computer system configured to perform one or more of the functions described herein, shown in a field environment with other apparatus with which the system may interoperate.

FIG. 19 illustrates an example system 600 that is configured to perform the functions described herein, in connection with operations performed by and data received from one or more rain gauge(s) 100, shown in a field environment with other apparatus with which the system may interoperate. In one embodiment, a user 602 may be understood to be a grower, who owns, operates or possesses a field communication device 604 disposed at, from time to time, a location associated with one or more fields, including the exemplary field 605, shown in FIG. 19. The field is intended for use in connection with agricultural activities. The communication device 604 is programmed or configured to provide field data 606, which is associated with the one or more fields (including the field 605), to an agricultural computer system 630, via one or more networks 609.

Examples of field data 606 may include (a) identification data (e.g., acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (e.g., crop type, crop variety, crop rotation, whether the crop is grown organically, harvest date, Actual Production History (APH), expected yield, yield, crop price, crop revenue, grain moisture, tillage practice, and previous growing season information, etc.), (c) soil data (e.g., type, composition, pH, organic matter (OM), cation exchange capacity (CEC)), (d) planting data (e.g., planting date, seed(s) type, relative maturity (RM) of planted seed(s), seed population, etc.), (e) treatment application data (e.g., fertilizer data (e.g., nutrient type (Nitrogen, Phosphorous, Potassium), application type, application date, amount, source, method), etc.) and/or chemical application (e.g., pesticide, herbicide, fungicide, other substance or mixture of substances intended for use as a plant regulator, defoliant, or desiccant, application date, amount, source, method, timing, etc.), (f) irrigation data (e.g., application date, amount, source, method, etc.), (g) weather data (e.g., precipitation, rainfall rate, predicted rainfall, amounts of rainfall, rates of rainfall, dates/times of rainfall, water runoff rate region, temperature, wind, forecast, pressure, visibility, clouds, heat index, dew point, humidity, snow cover/depth, air quality, sunrise, sunset, etc.), (h) imagery data (e.g., imagery and light spectrum information from an agricultural apparatus sensor, camera, computer, smartphone, tablet, unmanned aerial vehicle, planes or satellite, etc.), (i) scouting observations (e.g., photos, videos, free form notes, voice recordings, voice transcriptions, weather conditions (e.g., temperature, precipitation (current and over time), soil moisture, crop growth stage, wind velocity, relative humidity, dew point, black layer, etc.), etc.), and (j) soil, seed, crop phenology, pest and disease reporting, and predictions sources and databases.

A data server computer 608 (FIG. 19) is communicatively coupled to agricultural computer system 630 and is programmed or configured to send external data 610 to agricultural computer system 630 via the network(s) 609. The external data server computer 608 may be owned or operated by the same legal person or entity as the agricultural computer system 630, or by a different person or entity such as a government agency, non-governmental organization (NGO), and/or a private data service provider, etc. Examples of external data include weather data, imagery data, soil data, or statistical data relating to crop yields, among others. External data 610 may consist of the same type of information as field data 606. In some embodiments, the external data 610 is provided by external data server 608 owned by the same entity that owns and/or operates the agricultural computer system 630. For example, the agricultural computer system 630 may include a data server focused exclusively on a type of data that might otherwise be obtained from third party sources, such as weather data. In some embodiments, an external data server 608 may actually be incorporated within the system 630.

The field 605 may include, without limitation, any suitable growing spaces for a crop (e.g., several acres, an acre, a plot, a greenhouse, etc.). The field 605 often includes several acres and is defined by boundaries. The field 605 is planted with a specific seeds, as determined or selected by the grower 602, or another person associated with the field 605. The seeds grow into a crop on the field 605. The crop may include any desired crop within the scope of the present disclosure. For example, and without limitation, the crop may include wheat, maize, soybeans, etc.

As shown in FIG. 19, multiple rain gauges 100 are disposed in the field 605, and each is configured, generally, to perform one or more of the operations described herein (e.g., monitoring moisture received in the field 605, for example, from one or more rain event(s), from one or more irrigation event(s), etc.). As described, each of the rain gauges 100 includes sensors 130 configured to detect moisture received by the rain gauge 100. And, in this example embodiment, each of the rain gauges 100 is communicatively coupled either directly, or indirectly via another one of the rain gauges 100 (e.g., via a central one of the rain gauges, etc.), to the agricultural computer system 630 and are programmed or configured to send sensor data to the agricultural computer system 630. For example, one or more of the rain gauges 100 may be communicatively coupled to agricultural computer system 630 via the network(s) 609 and programmed or configured to receive one or more scripts that are used to control an operating parameter of the rain gauge(s) 100 and/or implemented from the agricultural computer system 630. For instance, a controller area network (CAN) bus interface may be used to enable communications from the agricultural intelligence computer system 630 to the rain gauge(s) 100, for example, via the CLIMATE FIELDVIEW DRIVE, available from The Climate Corporation, San Francisco, California, etc. Sensor data may include the same type of information as field data 606.

The network(s) 609 broadly represent any combination of one or more data communication networks including local area networks, wide area networks, internetworks or internets, using any of wireline or wireless links, including terrestrial or satellite links. The network(s) 609 may be implemented by any medium or mechanism that provides for the exchange of data between the various elements of FIG. 19. The various elements of FIG. 19 may also have direct (wired or wireless) communications links. As described above, one or more of the rain gauge(s) 100 generally include an interface compatible with the network(s) 609 and is/are programmed or configured to use standardized protocols for communication across the network(s) (e.g., wide area network (WAN, local area network (LAN), mobile network, etc.)), such as, for example, TCP/IP, Bluetooth, CAN protocol and higher-layer protocols, such as, for example, HTTP, TLS, and the like. In this manner, one or more of the rain gauge(s) 100 may also be configured to communicate with one or more other of the rain gauge(s) 100 via the network(s) 609.

Agricultural computer system 630 is programmed or configured to receive field data 606 from field communication device 604, external data 610 from external data server computer 608, and sensor data from the rain gauge(s) 100. Agricultural computer system 630 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to the rain gauge(s) 100, in the manner described further in other sections of this disclosure.

In an embodiment (as shown in FIG. 19), agricultural computer system 630 is programmed with or comprises a communication layer 632, a presentation layer 634, a data management layer 640, a hardware/virtualization layer 650, and a repository 660. "Layer," in this context, refers to any combination of electronic digital interface circuits, microcontrollers, firmware such as drivers, and/or computer programs or other software elements.

In particular, the communication layer 632 may be programmed or configured to perform input/output interfacing functions including sending requests to field communication device 604, external data server computer 608, and rain gauge(s) 100 for field data, external data, and sensor data respectively. The communication layer 632 may be programmed or configured to send the received data to model and field data repository 660 to be stored as field data 606. And, the presentation layer 634 may be programmed or configured to generate a graphical user interface (GUI) to be displayed on field communication device 604, or other computers that are coupled to the system 630 through the network(s) 609. The GUI may comprise controls for inputting data to be sent to agricultural intelligence computer system 630, generating requests for models and/or recommendations, and/or displaying recommendations, notifications, models, and other field data.

The data management layer 640 may be programmed or configured to manage read operations and write operations involving the repository 660 and other functional elements of the system, including queries and result sets communicated between the functional elements of the system and the repository. Examples of data management layer 640 include JDBC, SQL server interface code, and/or HADOOP interface code, among others. The repository 660 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 606 is not provided directly to the agricultural computer system 630 via one or more of the rain gauge(s) 100 that interacts with the agricultural computer system 630, the user 602 may be prompted via one or more user interfaces on the device 604 (served by the agricultural computer system 630) to input such information. In an example embodiment, the user 602 may specify identification data by accessing a map on the device 604 (served by the agricultural computer system 630) and selecting specific CLUs that have been graphically shown on the map. In an alternative embodiment, the user 602 may specify identification data by accessing a map on the device 604 (served by the agricultural computer system 630) and drawing boundaries of the field over the map. Such CLU selection or map drawings represent geographic identifiers. In alternative embodiments, the user 602 may specify identification data by accessing field identification data (provided as shape files or in a similar format) from the U. S. Department of Agriculture Farm Service Agency or other source via the user device and providing such field identification data to the agricultural computer system 630.

In an example embodiment, the agricultural computer system 630 is programmed or configured to generate and cause displaying of a graphical user interface comprising a data manager for data input. After one or more fields have been identified using the methods described above, the data manager may provide one or more graphical user interface widgets which when selected can identify changes to the field, moisture, soil, crops, tillage, or nutrient practices. The data manager may include a timeline view, a spreadsheet view, and/or one or more editable programs.

Figure 23:
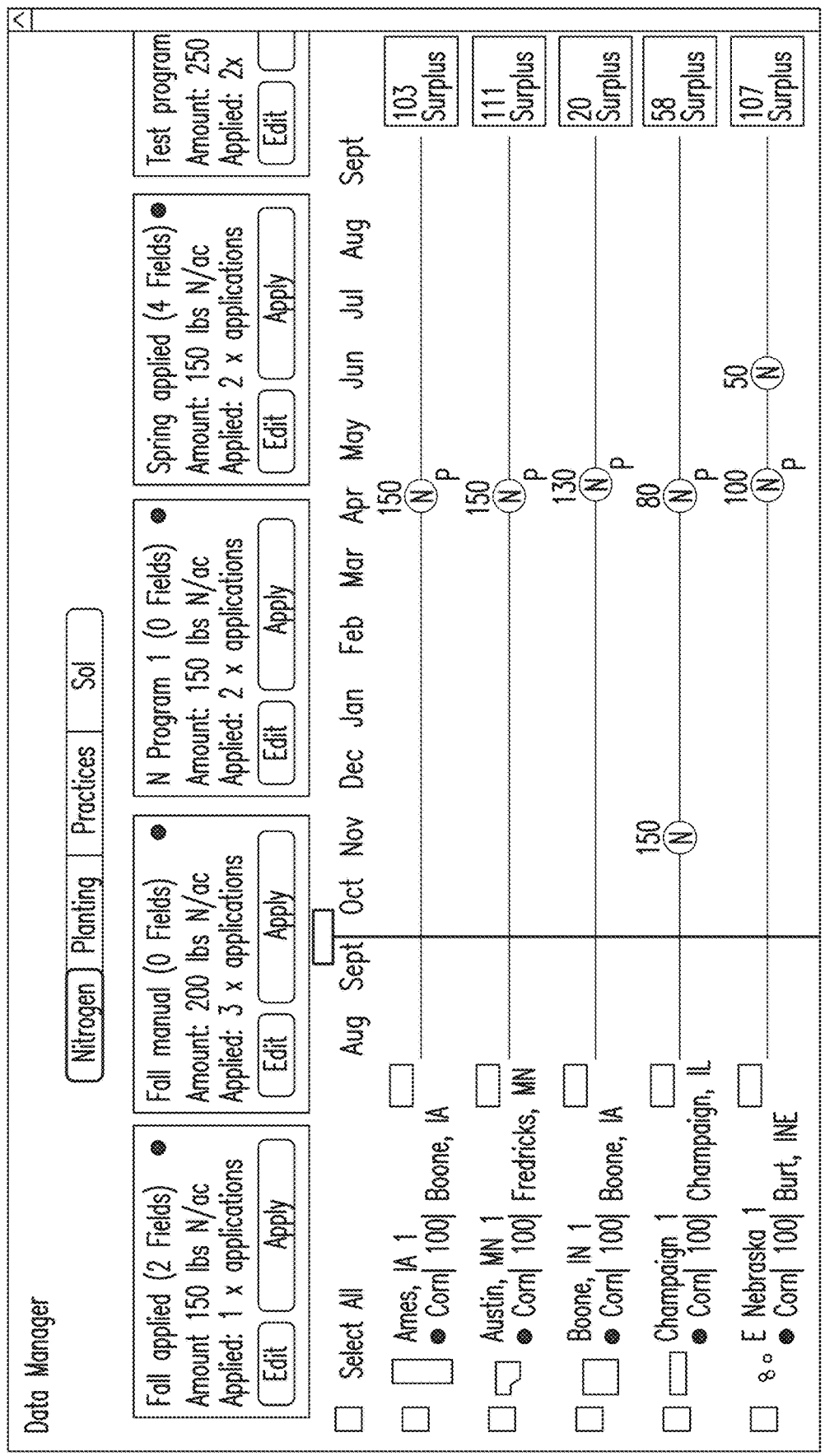
FIG. 23 depicts an example embodiment of a timeline view for data entry.

FIG. 23 depicts an example embodiment of a timeline view for data entry. Using the display depicted in FIG. 23, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices (taking into account moisture measured by the rain gauges 100), or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 23, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 23, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 23, the interface may update to indicate that the "Spring applied" program is no longer being applied to the top field. While the nitrogen application in early April may remain, updates to the "Spring applied" program would not alter the April application of nitrogen.

FIG. 24 depicts an example embodiment of a spreadsheet view for data entry. Using the display depicted in FIG. 24, a user can create and edit information for one or more fields. The data manager may include spreadsheets for inputting information with respect to Nitrogen, Planting, Practices, and Soil as depicted in FIG. 24. To edit a particular entry, a user computer may select the particular entry in the spreadsheet and update the values. For example, FIG. 24 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program (e.g., an update with regard to moisture measured in the field 605 by the rain gauges 100, etc.). Additionally, the data manager may remove the correspondence of the selected program to the field in response to receiving an edit to one of the entries for the field.

In an embodiment, model and field data is stored in the repository 660. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model generated or trained for analysis of past events on the one or more fields, a model generated or trained for analysis of the current status of the one or more fields, a model generated or trained for prediction of events on the one or more fields, and/or a model generated or trained for analysis of predicted events on the one or more fields (e.g., in comparison to current status, etc.). Model and field data may be stored in data structures in memory, rows in a database table, in flat files or spreadsheets, or other forms of stored digital data.

In an embodiment, instruction 635 comprises a set of one or more pages of main memory, such as RAM, in the agricultural computer system 630 into which executable instructions have been loaded and which when executed cause the agricultural computing system 630 to perform the functions or operations that are described herein. For example, the instructions 635 may comprise a set of pages in RAM that contain instructions which when executed cause performance of operations relating to measurement of moisture by the rain gauges 100 (e.g., counting and/or processing of droplets by the rain gauges 100, monitoring of operational status of the rain gauges 100, etc.) and/or operations relating to presentation of such data to user 602 and/or subsequent use of such data with regard to crops in the field 605 (e.g., harvesting, irrigating, etc.). The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, the instructions 635 also may represent one or more files or projects of source code that are digitally stored in a mass storage device such as non-volatile RAM or disk storage, in the agricultural computer system 630 or a separate repository system, which when compiled or interpreted cause generating executable instructions which when executed cause the agricultural computing system 630 to perform the functions or operations that are described herein.

Figure 22:
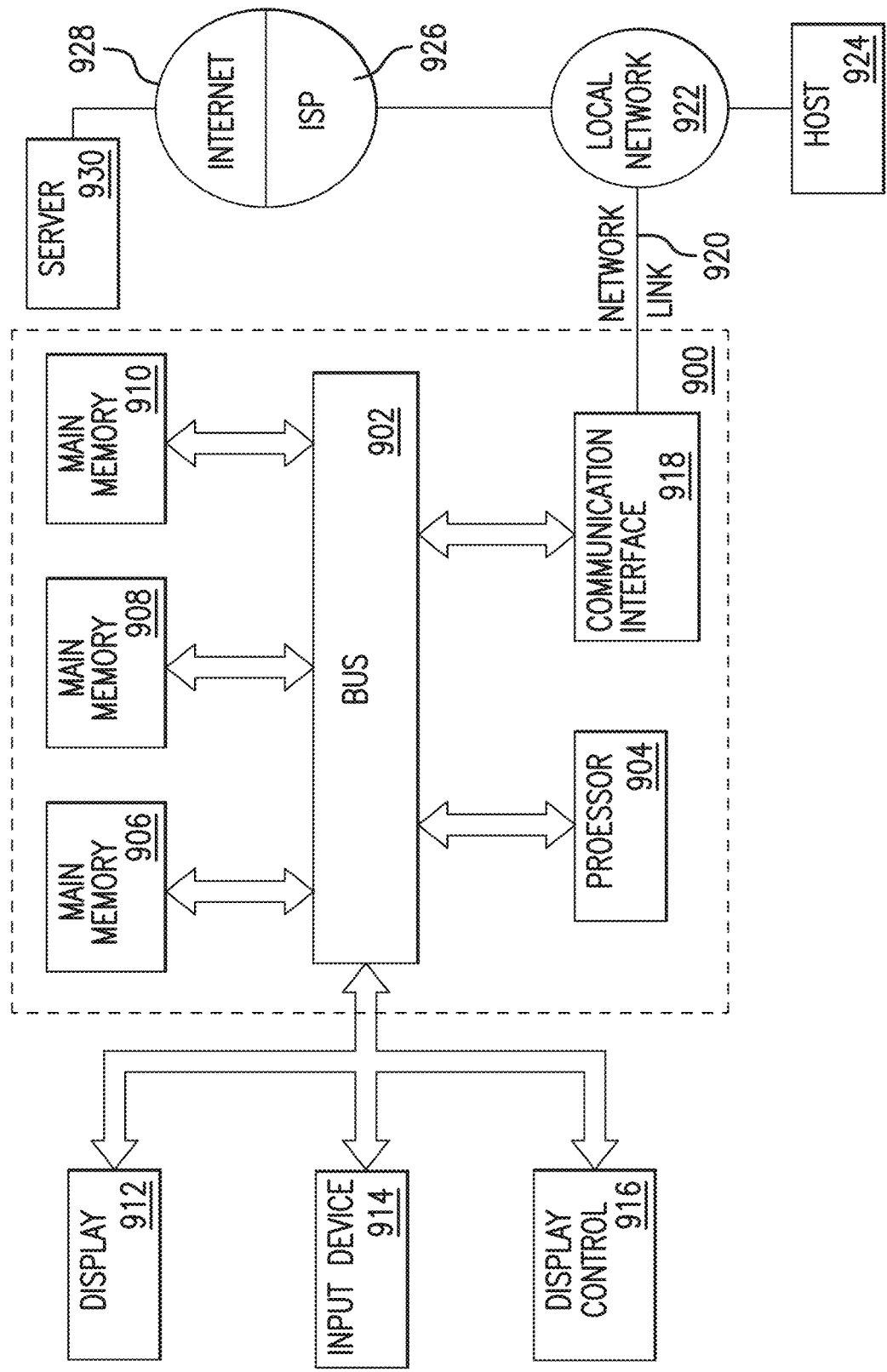
FIG. 22 is a block diagram that illustrates a computer system upon which an embodiment of the present disclosure may be implemented.

Hardware/virtualization layer 650 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 22. The layer 650 also may comprise programmed instructions that are configured to support virtualization, containerization, or other technologies.

For purposes of illustrating a clear example, FIG. 19 shows a limited number of instances of certain functional elements. However, in other embodiments, there may be any number of such elements. For example, embodiments may use thousands or millions of different mobile devices 604 associated with different users. Further, the agricultural computer system 630 and/or external data server computer 608 may be implemented using two or more processors, cores, clusters, or instances of physical machines or virtual machines, configured in a discrete location or co-located with other elements in a datacenter, shared computing facility or cloud computing facility.

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, the present disclosure is intended to provide disclosure of algorithms, plans or directions that are sufficient to permit a skilled person to program a computer to perform the functions that are described herein, in combination with the skill and knowledge of such a person given the level of skill that is appropriate for disclosures of this type.

In an embodiment, user 602 interacts with agricultural computer system 630 using field communication device 604 configured with an operating system and one or more application programs or apps; the field communication device 604 also may interoperate with the agricultural computer system 630 independently and automatically under program control or logical control and direct user interaction is not always required. Field communication device 604 broadly represents one or more of a smart phone, PDA, tablet computing device, laptop computer, desktop computer, workstation, or any other computing device capable of transmitting and receiving information and performing the functions described herein. Field communication device 604 may communicate via a network using a mobile application stored on field communication device 604. A particular user 602 may own, operate or possess and use, in connection with system 630, more than one field communication device 604 at a time.

The mobile application associated with the field communication device 604 may provide client-side functionality, via the network to one or more mobile computing devices. In an example embodiment, field communication device 604 may access the mobile application via a web browser or a local client application or app. Field communication device 604 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field communication device 604 which determines the location of field communication device 604 using standard tracking techniques such as multilateration of radio signals, the global positioning system (GPS), WiFi positioning systems, or other methods of mobile positioning. In some cases, location data or other data associated with the device 604, user 602, and/or user account(s) may be obtained by queries to an operating system of the device or by requesting an app on the device to obtain data from the operating system.

In an embodiment, field communication device 604 sends field data 606 to agricultural intelligence computer system 630 comprising or including, but not limited to, data values representing one or more of: a geographical location of the one or more fields, tillage information for the one or more fields, crops planted in the one or more fields, soil data extracted from the one or more fields, and moisture data for the one or more fields (e.g., as determined by rain gauges 100, etc.) etc. Field communication device 604 may send field data 606 in response to user input from user 602 specifying the data values for the one or more fields. Additionally, field communication device 604 may automatically send field data 606 when one or more of the data values becomes available to field communication device 604. For example, field communication device 604 may be communicatively coupled to one or more of the rain gauge(s) 100 in the field 605. In response to receiving data indicating that a moisture event has occurred (along with correspond data for the particular event), field communication device 604 may send field data 606 to agricultural computer system 630 indicating that a moisture event occurred (along with related data for the given moisture event). Field data 606 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, California. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it may, for example, combine historical data about the grower's fields with any other data that the grower desires to compare. The combinations and comparisons may be performed in real time, or not, and are based upon scientific models that provide potential scenarios to permit the grower to make better, more informed decisions.

Figure 20A:
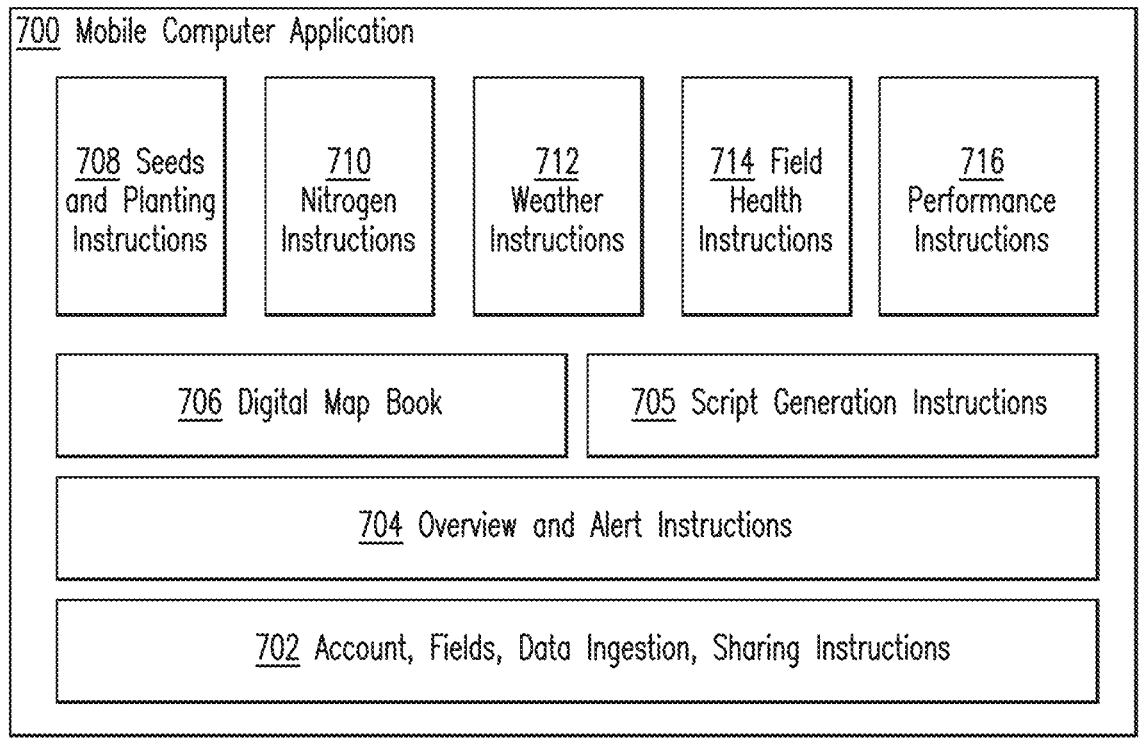
FIGS. 20A-20B illustrate two views of an example logical organization of sets of instructions in main memory when an example mobile application is loaded for execution.
Figure 20B:
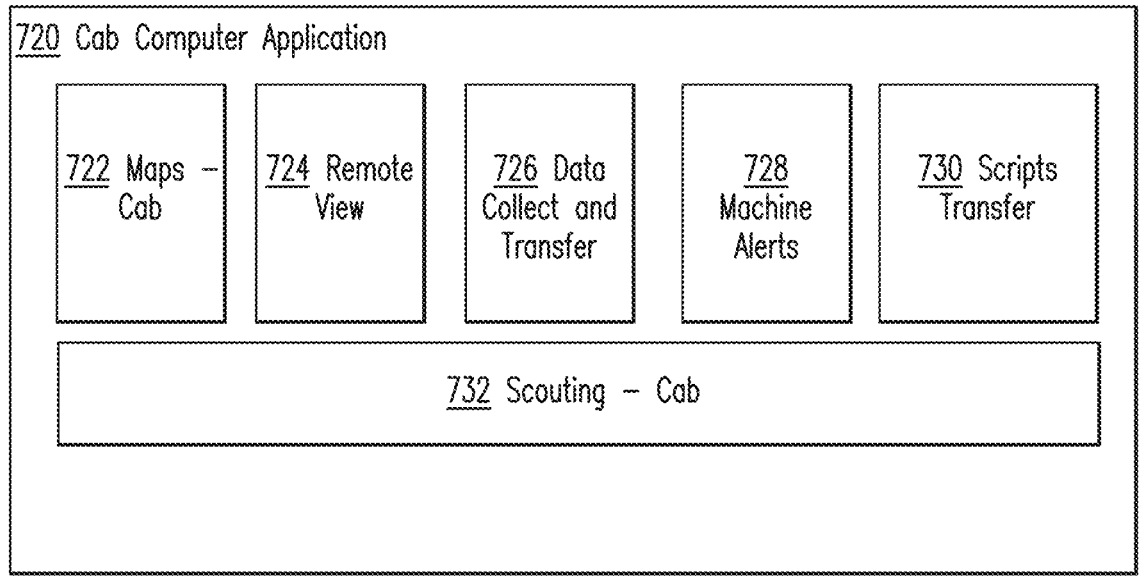

FIGS. 20A-20B illustrates two views of an example logical organization of sets of instructions in main memory when an example mobile application is loaded for execution. In FIGS. 20A-20B, each named element represents a region of one or more pages of RAM or other main memory, or one or more blocks of disk storage or other non-volatile storage, and the programmed instructions within those regions. In one embodiment, in FIG. 20A, a mobile computer application 700 comprises account, fields, data ingestion, sharing instructions 702, overview and alert instructions 704, digital map book instructions 706, seeds and planting instructions 708, treatment instructions 710, weather instructions 712, field health instructions 714, and performance instructions 716.

In one embodiment, a mobile computer application 700 comprises account, fields, data ingestion, sharing instructions 702 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 700 comprises a data inbox. In response to receiving a selection of the data inbox, the mobile computer application 700 may display a graphical user interface for manually uploading data files and importing uploaded files to a data manager.

In one embodiment, digital map book instructions 706 comprise field map data layers stored in device memory and are programmed with data visualization tools and geospatial field notes. This provides growers with convenient information close at hand for reference, logging and visual insights into field performance. In one embodiment, overview and alert instructions 704 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 708 are programmed to provide tools for seed selection, hybrid placement, and script creation, including variable rate (VR) script creation, based upon scientific models and empirical data. This enables growers to improve and/or maximize yield or return on investment through optimized seed purchase, placement and population.

In one embodiment, script generation instructions 705 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 700 may display one or more fields broken into management zones, such as the field map data layers created as part of digital map book instructions 706. In one embodiment, the management zones comprise soil zones along with a panel identifying each soil zone and a soil name, texture, drainage for each zone, moisture, or other field data. Mobile computer application 700 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 700 may make the script available for download in a format readable by an application controller, such as an archived or compressed format. Additionally, and/or alternatively, a script may be sent directly to a cab computer (e.g., associated with machinery in the field 605 such as a combine, harvester, tractor, etc.) from mobile computer application 700 and/or uploaded to one or more data servers and stored for further use (e.g., taking into account data provided by the rain gauge(s) 100, etc.).

In one embodiment, treatment instructions 710 are programmed to provide tools to inform treatment decisions by visualizing the availability of treatments to crops. This enables growers to improve and/or maximize yield or return on investment through the parameters of certain treatments (e.g., nitrogen, fertilizer, fungicides, other nutrients (such as phosphorus and potassium), pesticide, and irrigation, etc.) applied during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others.

"Mass data entry," in this context, may mean entering data once and then applying the same data to multiple fields and/or zones that have been defined in the system; example data may include treatment application data that is the same for many fields and/or zones of the same grower, but such mass data entry applies to the entry of any type of field data into the mobile computer application 700. For example, treatment instructions 710 may be programmed to accept definitions of application and practices programs and to accept user input specifying to apply those programs across multiple fields. For example, "nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. Such "nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Treatment instructions 710 also may be programmed to generate and cause displaying a treatment graph, which indicates projections of plant use of the specified treatment and whether a surplus or shortfall is predicted; in some embodiments, different color indicators may signal a magnitude of surplus or magnitude of shortfall. In one embodiment, a treatment graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each treatment applied and amount at points correlated to month names; and numeric and/or colored indicators of surplus or shortfall, in which color indicates magnitude.

In one embodiment, the treatment graph may include one or more user input features, such as dials or slider bars, to dynamically change the treatment planting and practices programs so that a user may alter the treatment graph. The user may then use his treatment graph and the related treatment planting and practices programs to implement one or more scripts, including variable rate (VR) fertility scripts. Treatment instructions 710 also may be programmed to generate and cause displaying a treatment map, which indicates projections of plant use of the specified treatment and whether a surplus or shortfall is predicted; in some embodiments, different color indicators may signal a magnitude of surplus or magnitude of shortfall. The treatment map may display projections of plant use of the specified treatment and whether a surplus or shortfall is predicted for different times in the past and the future (such as daily, weekly, monthly or yearly) using numeric and/or colored indicators of surplus or shortfall, in which color indicates magnitude. In one embodiment, the treatment map may include one or more user input features, such as dials or slider bars, to dynamically change the treatment planting and practices programs so that a user may alter his treatment map, such as to obtain a preferred amount of surplus to shortfall. The user may then use his optimized treatment map and the related treatment planting and practices programs to implement one or more scripts, including variable rate (VR) fertility scripts.

In one embodiment, weather instructions 712 are programmed to provide field-specific recent weather data and forecasted weather information. This enables growers to save time and have an efficient integrated display with respect to daily operational decisions.

In one embodiment, field health instructions 714 are programmed to provide timely remote sensing images highlighting in-season crop variation and potential concerns. Example programmed functions include cloud checking, to identify possible clouds or cloud shadows; determining indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 716 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 716 may be programmed to communicate via the network(s) 609 to back-end analytics programs executed at agricultural computer system 630 and/or external data server computer 608 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of a cab computer. For example, referring now to FIG. 20B, in one embodiment a cab computer application 720 may comprise maps-cab instructions 722, remote view instructions 724, data collect and transfer instructions 726, machine alerts instructions 728, script transfer instructions 730, and scouting-cab instructions 732. The code base for the instructions of FIG. 20B may be the same as for FIG. 20A and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 722 may be programmed to provide map views of fields, farms or regions that are useful in directing machine operation. The remote view instructions 724 may be programmed to turn on, manage, and provide views of machine activity in real-time or near real-time to other computing devices connected to the system 630 via wireless networks, wired connectors or adapters, and the like. The data collect and transfer instructions 726 may be programmed to turn on, manage, and provide transfer of data collected at sensors and controllers to the system 630 via wireless networks, wired connectors or adapters, and the like. The machine alerts instructions 728 may be programmed to detect issues with operations of the machine or tools that are associated with the cab and generate operator alerts. The script transfer instructions 730 may be configured to transfer in scripts of instructions that are configured to direct machine operations or the collection of data. The scouting-cab instructions 732 may be programmed to display location-based alerts and information received from the system 630 based on the location of the field communication device 604, rain gauges 100 in the field 605 and ingest, manage, and provide transfer of location-based scouting observations to the system 630 based thereon.

In an embodiment, external data server computer 608 stores external data 610, including soil data representing soil composition for the one or more fields and weather data representing temperature and precipitation on the one or more fields. The weather data may include past and present weather data as well as forecasts for future weather data. In an embodiment, external data server computer 608 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

The agricultural computer system 630 may obtain or ingest data under user control, on a mass basis from a large number of growers who have contributed data to a shared database system. This form of obtaining data may be termed "manual data ingest" as one or more user-controlled computer operations are requested or triggered to obtain data for use by the agricultural computer system 630. As an example, the CLIMATE FIELDVIEW application, commercially available from The Climate Corporation, San Francisco, California, may be operated to export data to agricultural computer system 630 for storing in the repository 660.

In an embodiment, the agricultural computer system 630 is programmed or configured to create an agronomic model. In this context, an agronomic model is a data structure in memory of the agricultural intelligence computer system 630 that comprises field data 606, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural computer system 630 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 21:
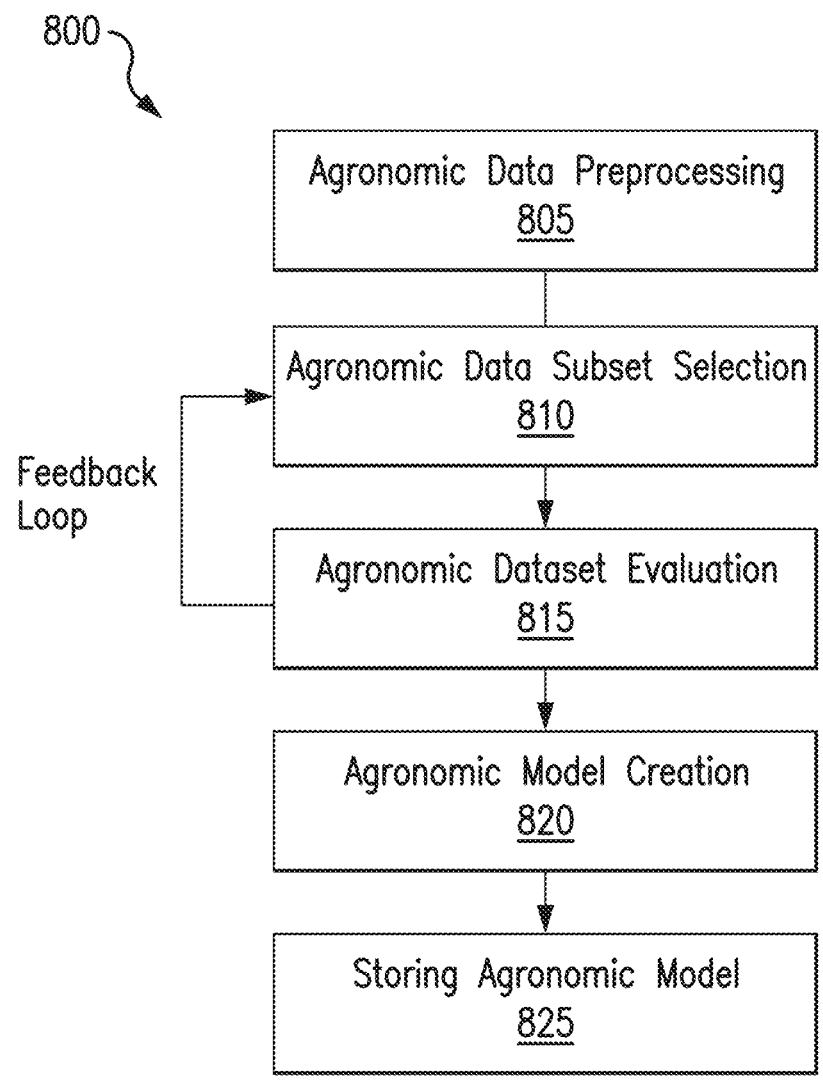
FIG. 21 illustrates a programmed process by which the system of FIG. 18 generates one or more preconfigured agronomic model(s) using agronomic data provided by one or more data source(s)

FIG. 21 illustrates a programmed process 800 by which the agricultural intelligence computer system generates one or more agronomic models using field data provided by one or more data sources. FIG. 21 may serve as an algorithm or instructions for programming the functional elements of the agricultural computer system 630 to perform the operations that are now described.

At block 805, the agricultural computer system 630 is configured or programmed to implement agronomic data preprocessing of field data received from one or more data sources (e.g., from one or more of the rain gauge(s) 100, etc.). The field data received from one or more data sources may optionally be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 810, the agricultural computer system 630 is configured or programmed to perform data subset selection using the preprocessed field data in order to identify datasets useful for initial agronomic model generation. The agricultural computer system 630 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 815, the agricultural computer system 630 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 810).

At block 820, the agricultural computer system 630 is configured or programmed to implement agronomic model creation based upon the cross validated agronomic datasets. In an embodiment, agronomic model creation may implement multivariate regression techniques to create the agronomic data models.

At block 825, the agricultural computer system 630 is configured or programmed to store the agronomic data models for future field data evaluation.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 22 is a block diagram that illustrates a computer system 900 upon which an embodiment of the present disclosure may be implemented. In connection therewith, it should also be appreciated that in some embodiments the rain gauge 100 may be considered a computing device consistent with the computer system 900. The computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), liquid crystal display (LCD), light emitting diode (LED), etc., for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device may, for example, have two degrees of freedom in two axes, a first axis (e.g., x, etc.) and a second axis (e.g., y, etc.), that allows the device to specify positions in a plane. The input device 914, more generally, includes any device through which the user is permitted to provide an input, data, etc., to the computer system 900.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infrared data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infrared signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information. In the rain gauge 100, for example, the one or more transceivers may each (or collectively) be considered an interface such as the communication interface 918 and/or may each (or collectively) be generally consistent with the communication interface 918.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

With that said, it should be appreciated that the functions described herein, in some embodiments, may be described in computer executable instructions stored on a computer readable media, and executable by one or more processors. The computer readable media is a non-transitory computer readable media. By way of example, and not limitation, such computer readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving a signal from a sensor of a moisture gauge indicative of a droplet of moisture at the sensor; (b) determining, based on the received signal, presence of a moisture event at the moisture gauge;

(c) in response to determining presence of the moisture event, transmitting an indication of the moisture event to a computing device; (d) in response to determining presence of the moisture event, and prior to transmitting the indication of the moisture event to the computing device, calculating an amount of moisture associated with the moisture event; (e) detecting a malfunction of the moisture gauge; (f) in response to detecting the malfunction of the moisture gauge, transmit an alert to the computing device indicative of the malfunction; and (g) filtering the moisture prior to forming the droplets from the received moisture.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" as well as the phrase "at least one of" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper", "lower" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the example embodiments has been provided for purposes of illustration and description. It is not intended to be exhaustive or to limit the present disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the present disclosure, and all such modifications are intended to be included within the scope of the present disclosure.

What is claimed is:

1. A rain gauge for monitoring moisture, the rain gauge comprising:
   a first basin including at least one outlet for forming and releasing droplets of moisture, the at least one outlet including a channel and a beveled discharge in communication with the channel, the beveled discharge including a hydrophobic configuration;
   at least two electrical contacts disposed proximate to the at least one outlet, wherein a closed circuit is formed between the at least two electrical contacts when a droplet formed by the at least one outlet contacts the at least two electrical contacts; and a processor communicatively coupled to the at least two electrical contacts, the processor configured to determine presence of a moisture event based on the closed circuit formed by the droplet and the at least two electrical contacts and, in response to the determination, transmit an indication of the moisture event to a computing device.

2. The rain gauge of claim 1, further comprising a second basin for collecting moisture, the second basin disposed above the first basin, wherein the second basin defines at least one opening through which the collected moisture flows from the second basin into the first basin.

3. The rain gauge of claim 2, further comprising a filter disposed between the first basin and the second basin.

4. The rain gauge of claim 1, wherein the processor is further configured, in response to determining presence of the moisture event, to calculate an amount of moisture associated with the moisture event based on a number of droplets formed by the at least one outlet during the moisture event, and wherein the indication includes the calculated amount of moisture.

5. The rain gauge of claim 1, wherein the processor is configured to transmit the indication of the moisture event to the computing device at a start of the moisture event; and wherein the processor is further configured to transmit a subsequent indication of the moisture event to the computing device at an interval during the moisture event.

6. The rain gauge of claim 1, wherein the processor is further configured to:

detect a malfunction of the rain gauge; and in response to detecting the malfunction of the rain gauge, transmit an alert to the computing device indicative of the malfunction.

7. The rain gauge of claim 1, wherein the first basin includes a textured surface configured to receive moisture into the first basin from the moisture event, and wherein the textured surface includes a hydrophilic configuration.

8. The rain gauge of claim 1, further comprising at least one solar panel coupled to the processor for powering the processor.

9. The rain gauge of claim 1, further comprising a housing coupled to the first basin, the housing defining at least one opening;

wherein the at least two electrical contacts are disposed at least partly in the at least one opening of the housing.

10. The rain gauge of claim 1, wherein the moisture event includes one of a precipitation event and an irrigation event.

11. A method for monitoring moisture associated with a moisture event, the method comprising:

receiving moisture associated with a moisture event in a basin of a moisture gauge;

forming, by an outlet of the basin, droplets from the received moisture, wherein the outlet includes a channel and a beveled discharge in communication with the channel, and wherein the beveled discharge includes a hydrophobic configuration;

directing the formed droplets from the outlet to a sensor disposed in alignment with the outlet;

identifying, by the sensor, the droplets and transmitting at least one signal to at least one processor of the moisture gauge for each of the identified droplets;

determining, by the at least one processor, presence of a moisture event based on the one or more signals from the sensor; and in response to the determination, transmitting, by the at least one processor, an indication of the moisture event to a computing device.

12. The method of claim 11, wherein the basin is a first basin;

wherein the method further includes collecting the moisture associated with the moisture event in a second basin; and wherein receiving the moisture associated with the moisture event in the first basin includes receiving the moisture into the first basin from the second basin.

13. The method of claim 11, wherein identifying the droplets includes identifying, by the sensor, the droplets in response to a closed circuit formed by the droplets between at least two electrical contacts of the sensor.

14. The method of claim 11, further comprising, in response to determining presence of the moisture event, and prior to transmitting the indication of the moisture event to the computing device, calculating, by the at least one processor, an amount of moisture associated with the moisture event based on a number of droplets identified by the sensor during the moisture event; and wherein transmitting the indication of the moisture event to the computing device includes transmitting the calculated amount of moisture to the computing device.

15. The method of claim 11, wherein transmitting the indication of the moisture event to the computing device includes transmitting the indication of the moisture event to the computing device at a start of the moisture event; and wherein the method further comprises transmitting a subsequent indication of the moisture event to the computing device at an interval during the moisture event.

16. The method of claim 11, further comprising:

detecting, by the at least one processor, a malfunction of the moisture gauge; and in response to detecting the malfunction of the moisture gauge, transmitting, by the at least one processor, an alert to the computing device indicative of the malfunction.

17. The method of claim 11, further comprising filtering the moisture prior to forming the droplets from the received moisture.

18. A system for use in monitoring precipitation associated with a moisture event, the system comprising:

a computing device; and multiple rain gauges disposed in a field and in network communication with the computing device, each of the multiple rain gauges including:

a first basin and a second basin, the second basin configured to receive moisture associated with a moisture event, the second basin including a first upper compartment and a second upper compartment, each of the first and second upper compartments including at least one opening outlet configured to pass moisture to the first basin;

wherein the first basin includes a first lower compartment below the at least one opening of the first upper compartment and a second lower compartment below the at least one opening of the second upper compartment, the first lower compartment including a first outlet and the second lower compartment including a second outlet, each of the first and second outlets configured to form and release droplets of the moisture;

a first sensor disposed proximate to the first outlet and a second sensor disposed proximate to the second outlet, each of the first and second sensors configured to identify the droplets formed by the respective outlet; and a processor communicatively coupled to the computing device and the first and second sensors, the processor configured to determine presence of a moisture event based on one or more signals from the first and second sensors identifying the droplets formed by the first and/or second outlets and, in response to the determination, transmit an indication of the moisture event to the computing device.

19. The system of claim 18, wherein the first and second sensors of each of the multiple rain gauges each include at least two electrical contacts; and wherein, for each of the multiple rain gauges, a closed circuit is formed between the at least two electrical contacts when a droplet released by one of the first and second outlets contacts two of the at least two electrical contacts, thereby generating the one or more signals.

* * * * *